US012769227B2

(12) United States Patent
Furuta

(10) Patent No.: US 12,769,227 B2
(45) Date of Patent: Oct. 20, 2026

(54) EXPOSURE APPARATUS AND IMAGE-FORMING APPARATUS

(71) Applicant: CANON KABUSHIKI KAISHA, Tokyo (JP)

(72) Inventor: Yasutomo Furuta, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 128 days.

(21) Appl. No.: 18/624,572

(22) Filed: Apr. 2, 2024

(65) Prior Publication Data

US 2024/0337964 A1 Oct. 10, 2024

(30) Foreign Application Priority Data

Apr. 4, 2023 (JP) ................................ 2023-060834

(51) Int. Cl.

*G03G 15/043* (2006.01)
*G06K 15/02* (2006.01)
*G06K 15/12* (2006.01)

(52) U.S. Cl.

CPC ........... *G03G 15/043* (2013.01); *G06K 15/12* (2013.01); *G06K 15/1868* (2013.01); *G06K 15/1872* (2013.01); *G03G 2215/0409* (2013.01); *G03G 2215/0429* (2013.01)

(58) Field of Classification Search

CPC ......... G03G 15/043; G03G 2215/0409; G03G 2215/0429; G03G 15/04054; G06K 15/12; G06K 15/1868; G06K 15/1872

See application file for complete search history.

(56) References Cited

U.S. PATENT DOCUMENTS

2011/0298884 A1* 12/2011 Furuta .................. G02B 26/123 347/224
2020/0073276 A1* 3/2020 Shindo ............. G03G 15/04018

FOREIGN PATENT DOCUMENTS

JP 2018001679 A 1/2018

* cited by examiner

*Primary Examiner* — Ricardo I Magallanes
*Assistant Examiner* — Tracey M Mcmillion
(74) *Attorney, Agent, or Firm* — Canon U.S.A., Inc. IP Division

(57) ABSTRACT

An exposure apparatus includes light-emitting elements arranged along a direction of a rotation axis of a photosensitive member and at least one processor. The at least one processor is configured to controls driving of the light-emitting elements, generate correction data for use in increasing or decreasing the number of the light-emitting elements to be turned on based on a correction amount for correcting unevenness in light amount, and correct image data in accordance with a value indicated by the correction data. For a pixel for which the correction amount indicates a value exceeding a predetermined limit value, the correction data indicates a value that is equal to or smaller than the limit value.

8 Claims, 19 Drawing Sheets

EXPOSURE APPARATUS AND IMAGE-FORMING APPARATUS

BACKGROUND

Field of the Disclosure

The present disclosure relates to an exposure apparatus and an image-forming apparatus.

Description of the Related Art

As a type of electrophotographic image-forming apparatus, an apparatus that uses a solid-state exposure method is commonly known, in which a latent image is formed by exposing a photosensitive drum with light emitted by LEDs (e.g. organic EL elements) instead of laser light. An exposure head of this type of apparatus includes a light-emitting element array that includes a plurality of light-emitting elements arranged parallel with an axial direction of the photosensitive drum, and a rod lens array that focuses light from the light-emitting element array on a surface of the photosensitive drum. Japanese Patent Laid-Open No. 2018-1679 discloses a method for use in an image-forming apparatus that uses the solid-state exposure method for correcting an unevenness (unevenness in light amount) in an image due to a light amount difference between a plurality of light-emitting chips constituting the light-emitting element array. In the correction method disclosed in Japanese Patent Laid-Open No. 2018-1679, a correction value for the light amount per light-emitting chip is determined based on the results of reading a test chart, and each light-emitting chip is driven so as to emit light with the light amount corrected in accordance with the determined correction value.

SUMMARY

However, unevenness in light amount does not necessarily occur per light-emitting chip. For example, a local error in a rod lens array and a light amount difference between light-emitting elements in a light-emitting chip may also cause an unevenness in light amount. This type of local unevenness in light amount cannot be resolved by the method for correction per light-emitting chip that is disclosed in Japanese Patent Application Laid-open No. 2018-1679. To eliminate a local unevenness in light amount, it is conceivable to correct pixel values of image data that affect whether or not to cause each light-emitting element to emit light. However, excessive correction of the pixel values may significantly change the shape of each dot formed by exposure, resulting in image deterioration.

In view of the foregoing issue, some embodiments of the present disclosure aim to provide an improved mechanism capable of reducing local unevenness in light amount while avoiding image deterioration.

According to an aspect, there is provided an exposure apparatus that exposes a photosensitive member with light in accordance with image data, the exposure apparatus including a plurality of light-emitting elements that are arranged along a direction of a rotation axis of the photosensitive member and configured to emit light for exposing the photosensitive member, and at least one processor. The at least one processor is configured to control turning on and off of the plurality of light-emitting elements in accordance with the image data, generate correction data for use in increasing or decreasing the number of the light-emitting elements to be turned on based on a correction amount for correcting unevenness in light amount, and correct the image data in accordance with a value indicated by the correction data. The correction data is generated such that the correction data indicates a first value for a pixel for which the correction amount indicates the first value that does not exceed a predetermined limit value, and the correction data indicates a second value for a pixel for which the correction amount indicates a value that exceeds the limit value, the second value being equal to or smaller than the limit value.

Further features of various embodiments will become apparent from the following description of exemplary embodiments (with reference to the attached drawings).

DESCRIPTION OF THE EMBODIMENTS

Figure 1:
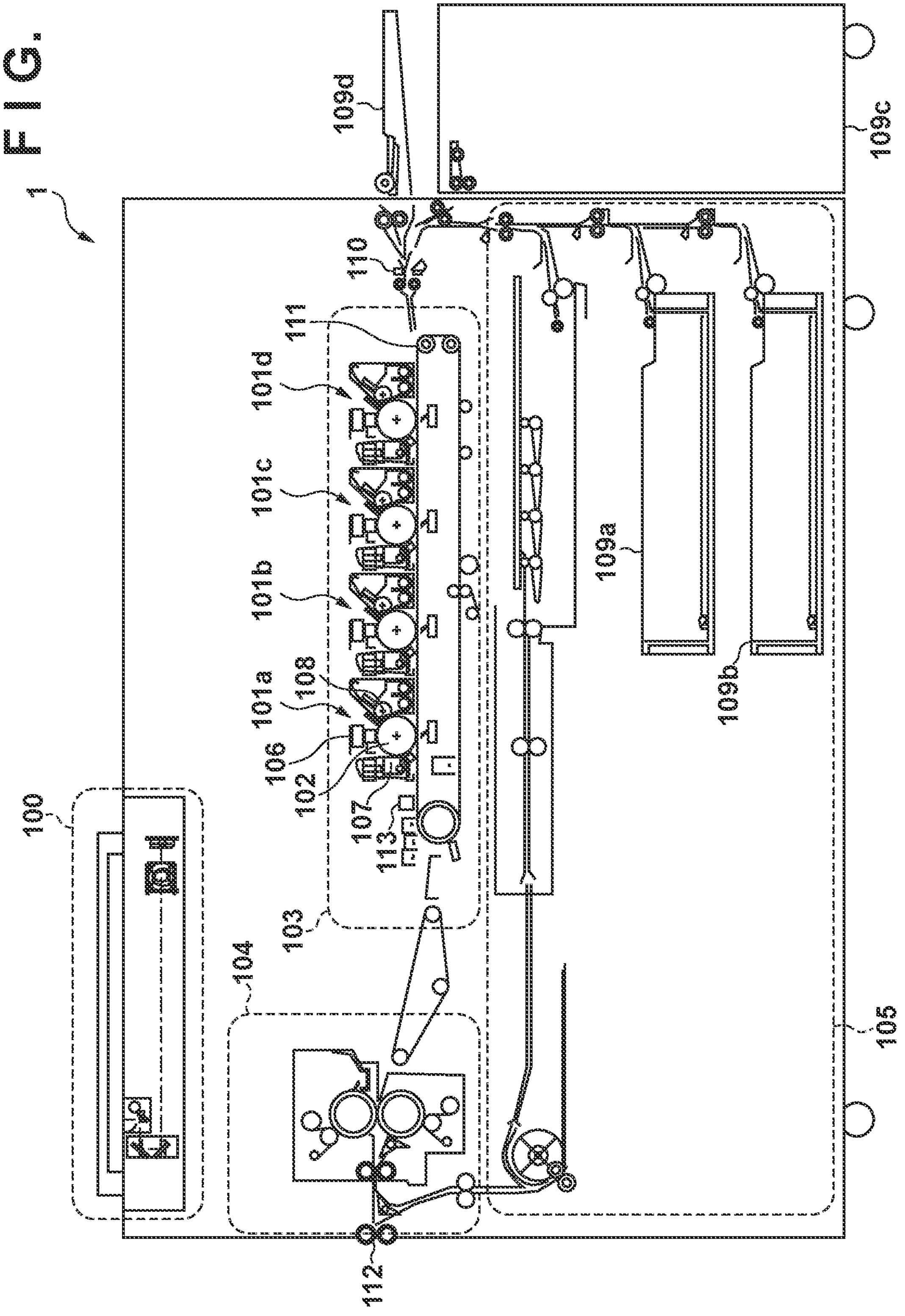
FIG. 1 is a configuration diagram showing a schematic configuration of an image-forming apparatus according to an embodiment.

Hereinafter, example embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

1. SCHEMATIC CONFIGURATION OF IMAGE-FORMING APPARATUS

FIG. 1 shows an example of a schematic configuration of an image-forming apparatus 1 according to an embodiment. The image-forming apparatus 1 includes a reading unit 100, an image-making unit 103, a fixing unit 104, and a transport unit 105. The reading unit 100 optically reads an original placed on a platen and generates read image data. The image-making unit 103 forms an image on a sheet based on the read image data generated by the reading unit 100 or based on print image data received from an external device via a network, for example.

The image-making unit 103 includes image-forming units 101*a*, 101*b*, 101*c*, and 101*d*. The image-forming units 101*a*, 101*b*, 101*c*, and 101*d* form toner images in black, yellow, magenta, and cyan, respectively. The image-forming units 101*a*, 101*b*, 101*c* and 101*d* have the same configuration, and are also referred to collectively as image-forming units 101 below. A photosensitive member 102 of each image-forming unit 101 is driven to rotate in the clockwise direction in the figure during image formation. A charger 107 electrically charges a corresponding photosensitive member 102. An exposure head 106 exposes a corresponding photosensitive member 102 with light in accordance with image data to form an electrostatic latent image on a surface of the photosensitive member 102. A developer 108 develops the electrostatic latent image on the surface of the photosensitive member 102 with toner to form a toner image. The toner image formed on the surface of the photosensitive member 102 is transferred to a sheet that is being transported on a transfer belt 111. A color image containing four color components, namely black, yellow, magenta, and cyan can be formed by transferring the toner images of the four photosensitive members 102 to the sheet in a superimposed manner.

The transport unit 105 controls the feeding and transporting of sheets. Specifically, the transport unit 105 feeds a sheet from a unit designated from among internal storage units 109*a* and 109*b*, an external storage unit 109*c*, and a manual feed unit 109*d* to a transport path in the image-forming apparatus 1. The fed sheet is transported to a registration roller 110. The registration roller 110 transfers the sheet onto the transfer belt 111 at an appropriate timing such that the toner image of each photosensitive member 102 is transferred to the sheet. As mentioned above, the toner images are transferred to the sheet while the sheet is transported on the transfer belt 111. The fixing unit 104 fixes the toner images to the sheet by heating and pressurizing the sheet to which the toner images have been transferred. After the toner images have been fixed, the sheet is discharged to outside the image-forming apparatus 1 by a discharge roller 112. An optical sensor 113 is located at a position facing the transfer belt 111 in a downstream stage of the image-forming unit 101*a*. The optical sensor 113 is used to detect a misalignment (color misalignment) between color components in a test image formed on the transfer belt 111 by the image-forming units 101. If a color misalignment is detected, the image-forming positions of the image-forming units 101*a*, 101*b*, 101*c*, and 101*d* are corrected so as to compensate for the detected color misalignment under the control of an image controller 800 described below.

Although an example in which the toner image is directly transferred from each photosensitive member 102 to the sheet on the transfer belt 111 has been described here, the toner image may alternatively be transferred indirectly from each photosensitive member 102 to the sheet via an intermediate transfer member. Further, although an example of forming a color image using toner of multiple colors has been described here, the technology according to the present disclosure is also applicable to an image-forming apparatus that forms a monochrome image using toner of a single color.

2. CONFIGURATION EXAMPLE OF EXPOSURE HEAD

Figure 2A:
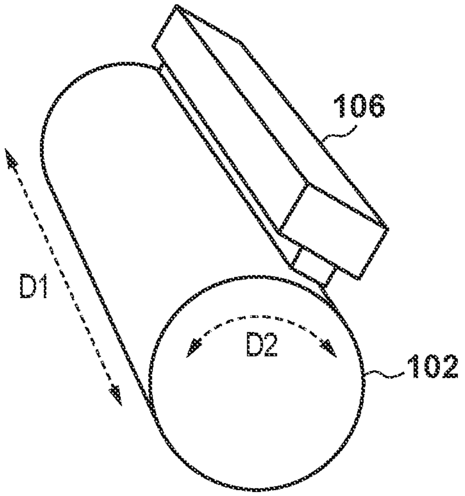
FIG. 2A is a first illustrative diagram showing a configuration of a photosensitive member and an exposure head according to an embodiment.
Figure 2B:
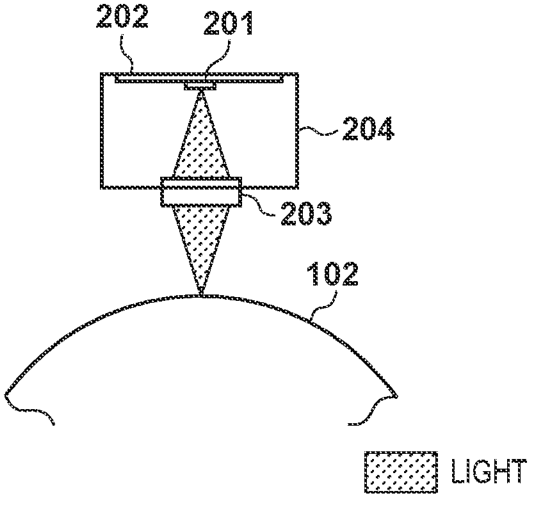
FIG. 2B is a second illustrative diagram showing a configuration of the photosensitive member and the exposure head according to an embodiment.

FIGS. 2A and 2B show the photosensitive member 102 and the exposure head 106. As mentioned above, the exposure head 106 is an exposure apparatus that exposes the photosensitive member 102 with light in accordance with image data. The exposure head 106 includes a light-emitting element array 201, a printed circuit board 202 on which the light-emitting element array 201 is mounted, a rod lens array 203, and a housing 204 supporting the printed circuit board 202 and the rod lens array 203. The photosensitive member 102 has a cylindrical shape. The exposure head 106 is located such that the longitudinal direction thereof is parallel with a direction of a rotation axis (axial direction D1) of the photosensitive member 102, and a face of the exposure head 106 to which the rod lens array 203 is attached faces the surface of the photosensitive member 102. While the photosensitive member 102 rotates about the rotation axis in a circumferential direction D2, the light-emitting element array 201 of the exposure head 106 emits light, and the rod lens array 203 forms an image on the surface of the photosensitive member 102 with the emitted light.

Figure 3A:
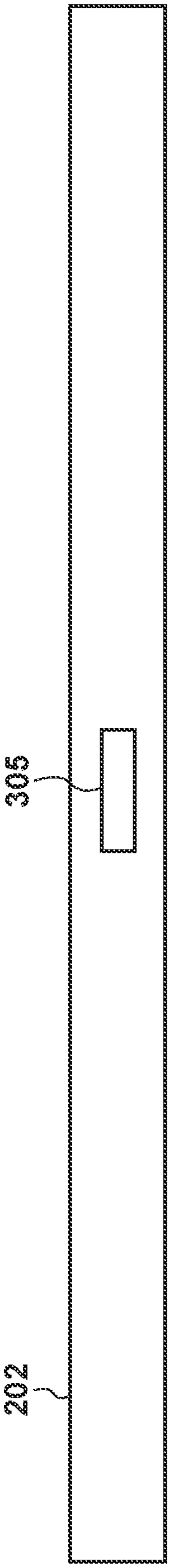
FIG. 3A is a first illustrative diagram showing a configuration of a printed circuit board of the exposure head according to an embodiment.
Figure 3B:
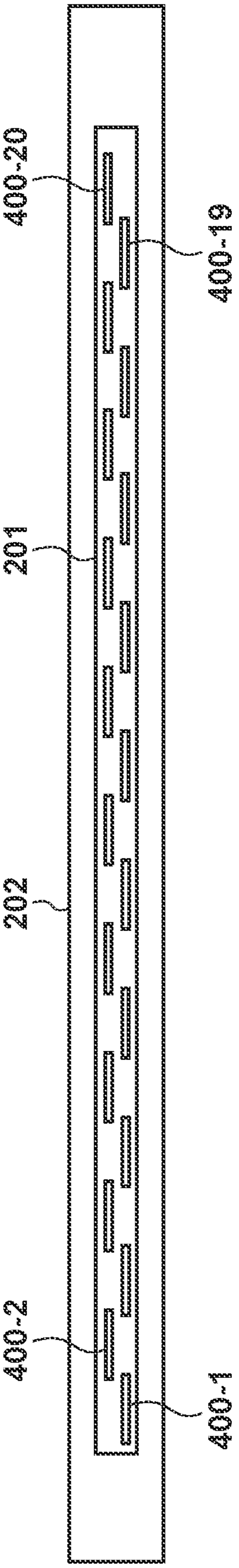
FIG. 3B is a second illustrative diagram showing a configuration of the printed circuit board of the exposure head according to an embodiment.

FIGS. 3A and 3B show an example of a configuration of the printed circuit board 202. Note that FIG. 3A shows a face on which a connector 305 is mounted, and FIG. 3B shows a side on which the light-emitting element array 201 is mounted (a face on the side opposite to the face on which the connector 305 is mounted). The light-emitting element array 201 in the present embodiment is constituted by twenty light-emitting chips 400-1 to 400-20, which are regularly arranged in the longitudinal direction. The light-emitting chips 400-1 to 400-20 in the example in FIG. 3B are in a staggered arrangement along the longitudinal direction of the printed circuit board 202 of the exposure head 106. Specifically, ten light-emitting chips 400-*n*, with n being odd numbers, form one line, and another ten light-emitting chips 400-*n*, with n being even numbers, form another one line. In this specification, the light-emitting chips 400 in the former line are also referred to as odd-numbered light-emitting chips 400, and the light-emitting chips 400 in the latter line are referred to as even-numbered light-emitting chips 400. The light-emitting chips 400-1 to 400-20 are also referred to collectively as light-emitting chips 400. Each light-emitting chip 400 on the printed circuit board 202 is connected to the image controller 800 (FIG. 8) via the connector 305. In the following, there are cases where the smaller branch number side of the light-emitting chips 400-1 to 400-20 arranged in the axial direction D1 is referred to as "left" and the larger branch number side as "right", for convenience of description. For example, the light-emitting chip 400-1 is a light-emitting chip 400 at the left end, and the light-emitting chip 400-20 is a light-emitting chip at the right end.

Figure 4:
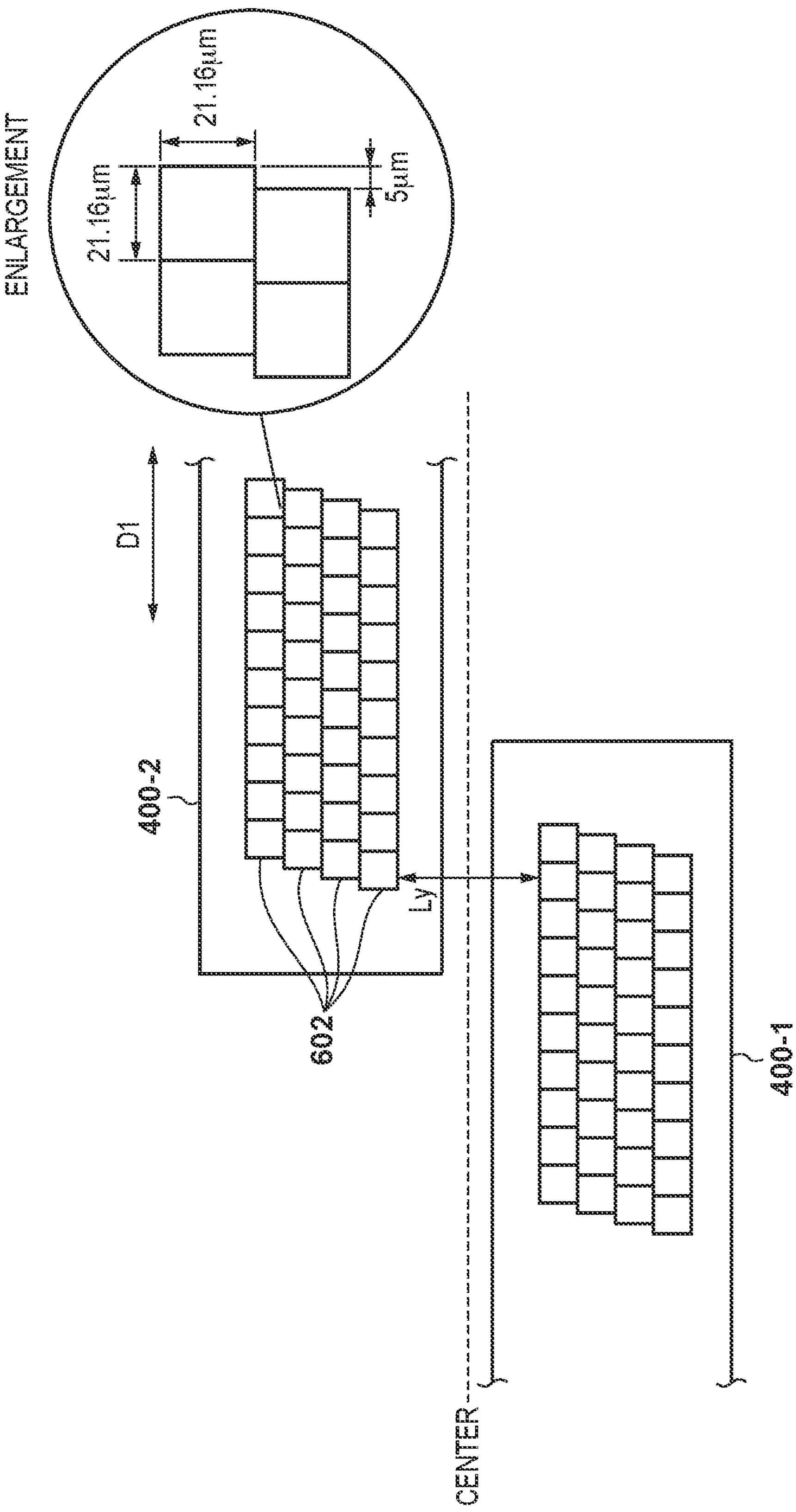
FIG. 4 is an illustrative diagram showing an example of arrangement of light-emitting elements in the light-emitting chips according to an embodiment.

FIG. 4 is an illustrative diagram showing an example of the arrangement of light-emitting elements 602 in the light-emitting chips 400. The light-emitting elements 602 in each light-emitting chip 400 are in a two-dimensional array forming N columns (N is an integer of 2 or more) in the axial direction D1 and M rows (M is an integer of 2 or more) in the circumferential direction D2. In other words, the light-emitting chips 400 include respective subsets of the entire array of the light-emitting elements 602. In an illustrative embodiment, N may be 748 and M may be 4; in this case, each light-emitting chip 400 has a total of 2992 (=748×4) light-emitting elements 602. In the entire light-emitting element array that includes 20 light-emitting chips 400, 14960 light-emitting elements are arranged in the axial direction D1. The pitch of light-emitting elements 602 adjoining in the axial direction D1 may be approximately 21.16 μm in correspondence with a resolution of 1200 dpi. In this case, the length of the entire light-emitting element array in the axial direction D1 is approximately 316 mm (maximum width of a formable image), and the length of each light-emitting chip 400 in the axial direction D1 is approximately 15.8 mm. The M light-emitting elements in the respective columns are shifted from each other in the axial direction D1 at a pitch of about 5 μm, which corresponds to a resolution of 4800 dpi, and arranged in a staircase pattern. FIG. 4 shows an example in which the lower light-emitting elements, of the two upper and lower light-emitting elements, is shifted to the left, but the lower light-emitting element may alternatively be shifted to the right. Further, the light-emitting elements in the right-end column of an odd-numbered light-emitting chip 400 and the light-emitting elements in the left-end column of an even-numbered light-emitting chip 400 may overlap with each other in the axial direction D1, as shown in FIG. 4. Similarly, the light-emitting elements in the left-end column of an odd-numbered light-emitting chip 400 and the light-emitting elements in the right-end column of an even-numbered light-emitting chip 400 may also overlap with each other in the axial direction D1. The distance Ly between light-emitting element arrays in these light-emitting chips 400 may be, for example, about 105 μm. By thus arranging the light-emitting element arrays to overlap with each other in the axial direction D1, it is possible to avoid a situation in which implementation variation results in voids within an exposable range. When such an overlapping arrangement is employed, ordinarily, the light-emitting elements in only one of the overlapping columns are used as effective light-emitting elements that may emit light in accordance with image data. The light-emitting elements in the other column need not be used regardless of image data. Note that the number of columns or light-emitting elements overlapping in the axial direction D1 is not limited to the above example (four pixels in one column), but may be any number.

Figure 5:
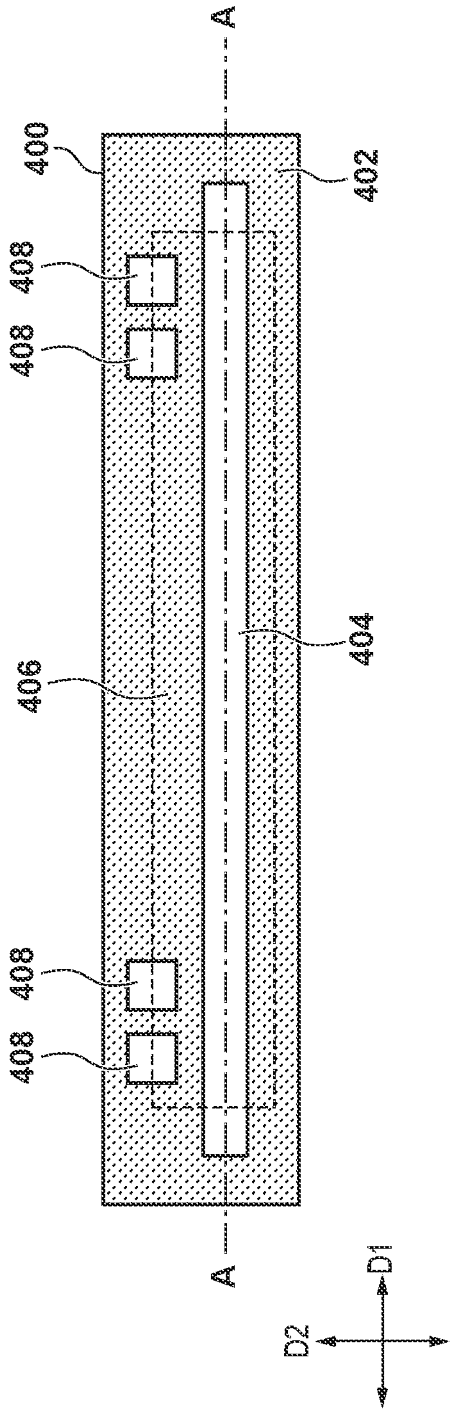
FIG. 5 is a plan view of a schematic configuration of the light-emitting chip according to an embodiment.

FIG. 5 is a plan view of a schematic configuration of the light-emitting chip 400. The plurality of light-emitting elements 602 of each light-emitting chip 400 are formed on a light-emitting substrate 402, which is a silicon substrate, for example. The light-emitting substrate 402 has a circuit section 406 for driving the plurality of light-emitting elements 602. A plurality of pads 408 are used to connect, to the circuit section 406, signal lines for communicating with the image controller 800, power lines for connection with power supplies, and ground lines for connection with ground. The signal lines, the power lines, and the ground lines may be gold wires, for example.

Figure 6:
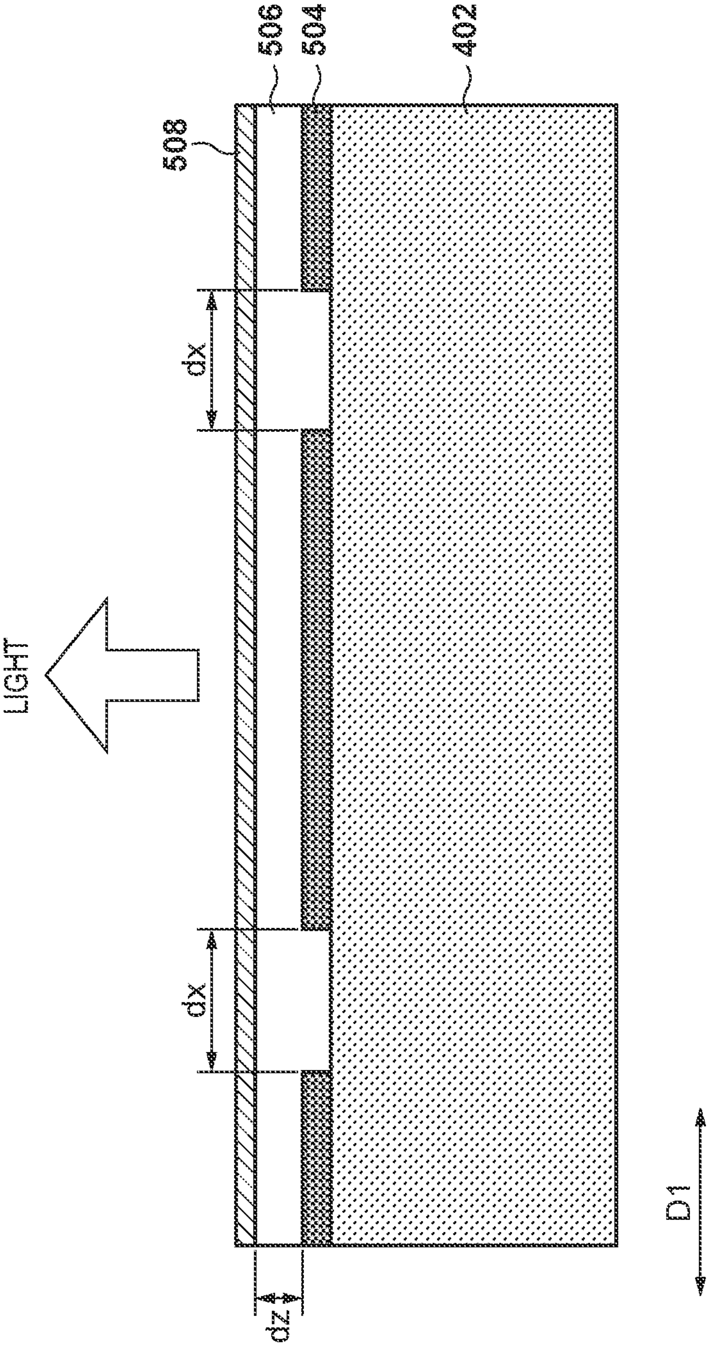
FIG. 6 is a cross-sectional view of a schematic configuration of the light-emitting chip according to an embodiment.

FIG. 6 shows a portion of a cross-section of FIG. 5 taken along a line A-A. A plurality of lower electrodes 504 are formed on the light-emitting substrate 402. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, the light-emitting layer 506 emits light as a result of a current flowing from the lower electrodes 504 to the upper electrode 508. Thus, one lower electrode 504 and partial regions of the light-emitting layer 506 and the upper electrode 508 that correspond to the lower electrode 504 constitute one light-emitting element 602. "dx" in the figure indicates the distance between two adjoining lower electrodes 504. "dz" indicates the distance between the lower electrodes 504 and the upper electrode 508. Making dx larger than dz can suppress a leakage current between adjoining lower electrodes 504 and prevent a light-emitting element 602 that should not emit light from accidentally emitting light.

In the present embodiment, the light-emitting elements 602 are configured as organic electro-luminescence (EL) elements. For example, an organic EL film can be used as the light-emitting layer 506. In another embodiment, the light-emitting elements 602 may be configured as inorganic EL elements by using an inorganic EL film as the light-emitting layer 506. Generally, a light-emitting element 602 may be any type of light-emitting diode (LED).

The upper electrode 508 is constituted by a transparent electrode made of indium tin oxide (ITO) or the like so as to allow the emission wavelength of the light-emitting layer 506 to be transmitted. In the example in FIG. 6, the entire upper electrode 508 allows the emission wavelength of the light-emitting layer 506 to be transmitted, but the entire upper electrode 508 need not necessarily allow the wavelength of the light-emitting layer 506 to be transmitted. Specifically, it is sufficient that a partial region through which light from each light-emitting element 602 passes allows the emission wavelength to be transmitted.

Although one continuous light-emitting layer 506 is formed in FIG. 6, a plurality of light-emitting layers 506 each having a width equal to the width of a corresponding lower electrode 504 may alternatively be formed on the respective lower electrodes 504. Further, in FIG. 6, the upper electrode 508 is formed as one common electrode for the plurality of lower electrodes 504; however, a plurality of upper electrodes 508 each having a width equal to the width of a corresponding lower electrode 504 may alternatively be formed in correspondence with the respective lower electrodes 504. Further, a first plurality of lower electrodes 504, out of the lower electrodes 504 of each light-emitting chip 400, may be covered by a first light-emitting layer 506, and a second plurality of lower electrodes 504 may be covered by a second light-emitting layer 506. Similarly, a first upper electrode 508 may be formed in common for a first plurality of lower electrodes 504, out of the lower electrodes 504 of each light-emitting chip 400, and a second upper electrode 508 may be formed in common for a second plurality of lower electrodes 504. With such a configuration as well, one lower electrode 504 and regions of the light-emitting layer 506 and the upper electrode 508 that correspond to the lower electrode 504 constitute one light-emitting element 602.

3. MULTIPLE EXPOSURE

While the use of organic EL elements as the light-emitting elements 602 facilitates downsizing and cost reduction of the apparatus, there are cases where the amount of light that can be emitted by a single organic EL element is insufficient to form an image with a desired density. The present embodiment adopts a multiple exposure technique to subject each pixel region (spot region) on the photosensitive member 102 to multiple exposures by causing the plurality of light-emitting elements 602 arranged in the circumferential direction of the photosensitive member 102 to successively emit light.

Figure 7:
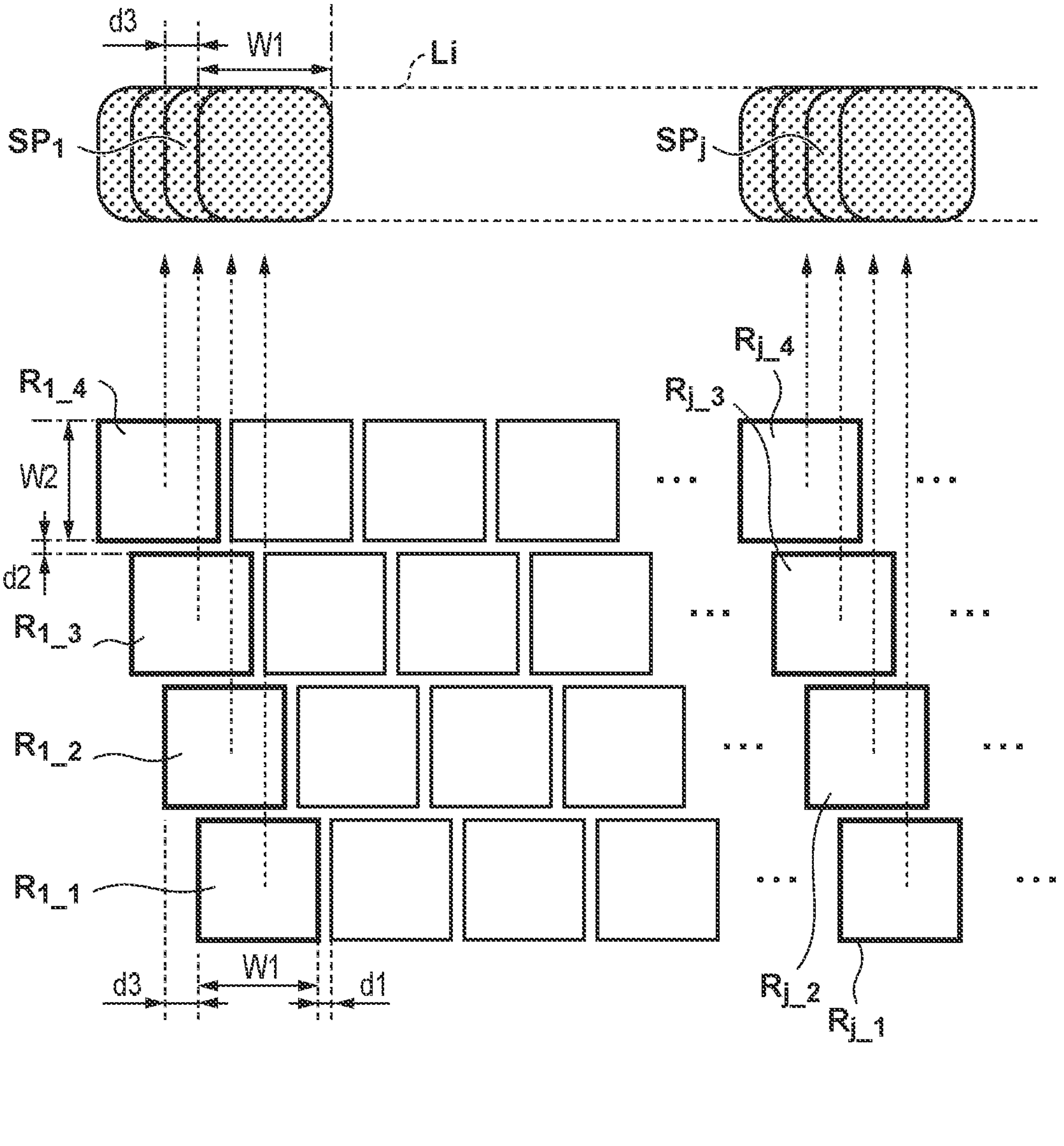
FIG. 7 is an illustrative diagram regarding multiple exposure performed with light-emitting elements arranged in a staircase pattern.

FIG. 7 is an illustrative diagram regarding multiple exposures performed with light-emitting elements arranged in a staircase pattern. In the present embodiment, M light-emitting elements 602 in each column of the light-emitting element array may be arranged in a staircase pattern at a constant pitch, as mentioned above. Here, an example of an arrangement of light-emitting elements in a case of M=4 is shown. $R_{j\_m}$ (j={1, 2, . . . , N}, m={1, 2, 3, 4}) in the figure represents a light-emitting element 602 in a j-th column from the left in the axial direction and an m-th row from the bottom in the circumferential direction. W1 in the figure denotes the width of each light-emitting element 602 in the axial direction, and W2 denotes the width of each light-emitting element 602 in the circumferential direction. d1 denotes the gap between adjoining light-emitting elements 602 in the axial direction, and d2 denotes the gap between adjoining light-emitting elements 602 in the circumferential direction. d1 and d2 represent the aforementioned distance dx between electrodes that is divided into ones in two coordinate axes, and both are determined so as to be wider than the distance dz between the upper electrode and the lower electrode. The minimum pitch d3 of the light-emitting elements 602 in the axial direction may be about 5 μm (equivalent to 4800 dpi), as mentioned above.

As four light-emitting elements in each column are arranged in a staircase pattern as in the example in FIG. 7, any two adjoining light-emitting elements among those four light-emitting elements occupy partially overlapping areas in the axial direction. The four light-emitting elements in a column corresponding to each pixel position on input image data successively emit light while the photosensitive member 102 rotates, thereby forming a spot corresponding to the pixel position on the surface of the photosensitive member 102. In the example in FIG. 7, when the pixel value at the left end of an i-th line of input image data indicates that light emission is on, light-emitting elements $R_{1\_1}$, $R_{1\_2}$, $R_{1\_3}$, and $R_{1\_4}$ successively emit light at the timing at which the respective light-emitting elements face a line $L_i$ on the surface of the photosensitive member 102. As a result, the spot region at the left end of the line $L_i$ is subjected to multiple exposures, and a corresponding spot $SP_1$ is formed. Similarly, when a j-th pixel value from the left end of the i-th line of the input image data indicates that light emission is on, light-emitting elements $R_{j\_1}$, $R_{j\_2}$, $R_{j\_3}$, and $R_{j\_4}$ successively emit light at the timing at which the respective light-emitting elements face the line $L_i$ on the surface of the photosensitive member 102. As a result, a j-th spot region from the left end of the line $L_i$ is subjected to multiple exposures, and a corresponding spot $SP_j$ is formed. When the pitch of the light-emitting elements in the circumferential direction is approximately 21.16 μm and the sheet transport speed is 200 mm/s, the period during which each line is exposed by one light-emitting element $R_{j\_m}$ (line period) may be approximately 105.8 μs. In this manner, as a result of four light-emitting elements in each column of twenty light-emitting chips 400 successively emitting light at appropriate timings, a smooth line of an electrostatic latent image that is constituted by a series of spots with a constant spot spacing that partially overlap with each other may be formed on the surface of photosensitive member 102. Then, a two-dimensional electrostatic latent image is produced as a result of such lines being continuously formed in the circumferential direction.

In the following description, a spot region in which a spot of an electrostatic latent image is formed as a result of multiple exposures performed with light emitted by M light-emitting elements 602 is referred to as an "exposed dot", and a spot region in which no spot is formed due to no light-emitting element 602 emitting light is referred to as a "non-exposed dot".

4. LIGHT EMISSION CONTROL

<4-1. Configuration of Control Circuit>

Figure 8:
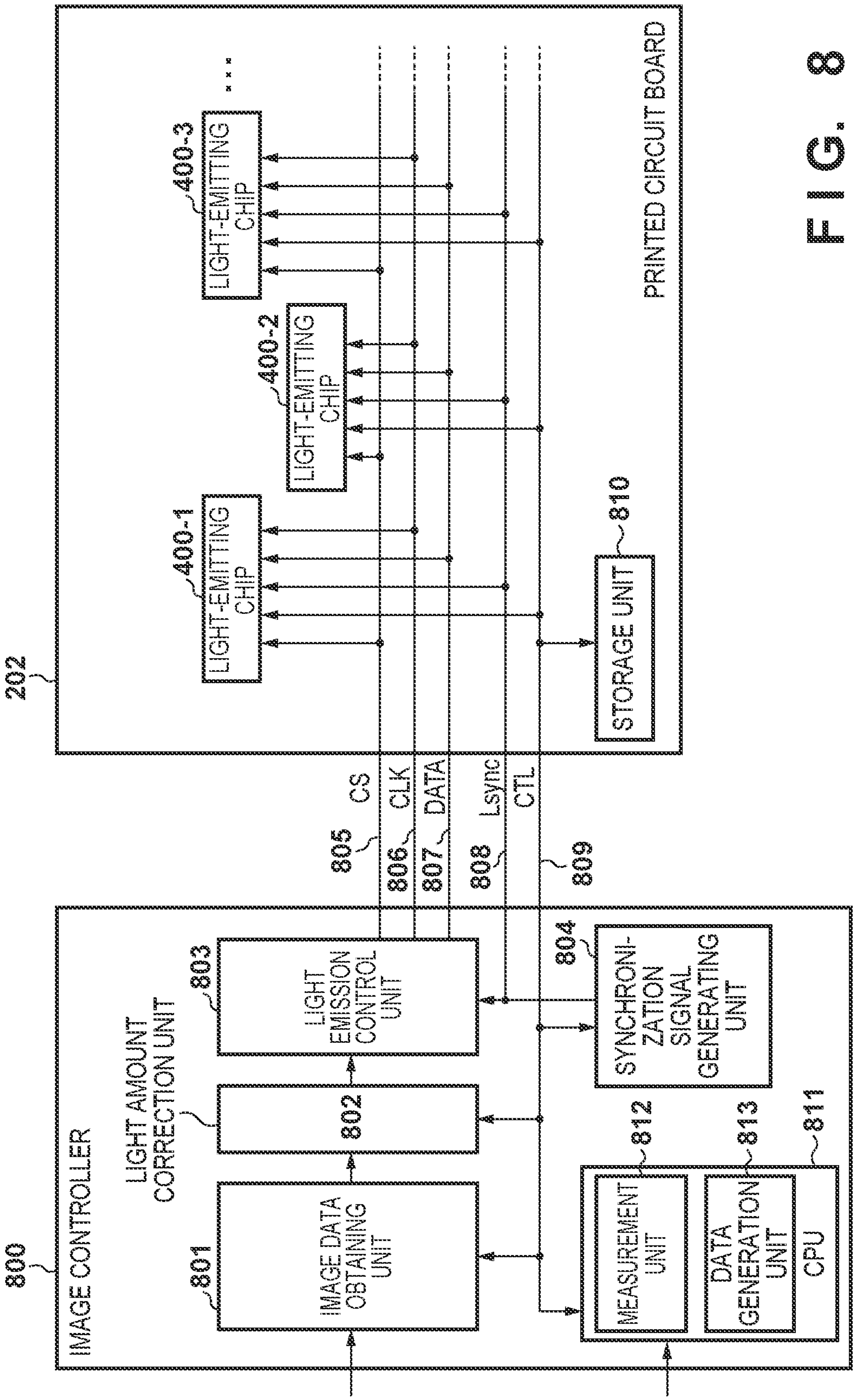
FIG. 8 is a configuration diagram of a control circuit for controlling light emission performed by the light-emitting chips on the printed circuit board.

FIG. 8 shows an example of a configuration of a control circuit for controlling light emission from the light-emitting chips 400 on the printed circuit board 202. Here, processing for a single color component will be described to simplify the description; however, in practice, the same processing is performed for four color components in parallel. The image controller 800 is connected to each of the light-emitting chips 400 on the printed circuit board 202 via a plurality of signal lines 805 to 809. A chip select signal line 805 carries a chip select signal CS, which indicates an effective range of image data. A clock signal line 806 carries a clock signal CLK. A data signal line 807 carries image data DATA. A synchronization signal line 808 carries a line synchronization signal Lsync for identifying a line period for the image data. A communication signal line 809 carries a control signal CTL.

An image data obtaining unit 801 obtains image data from the reading unit 100 or an external device, performs image processing on the obtained image data, and generates image data in a binary bitmap format for performing control to cause the light-emitting elements 602 of the light-emitting element array 201 to emit light or not emit light. Image processing here may include, for example, raster transformation and halftoning (e.g., dithering). Image data after being subjected to halftoning is a set of bits indicating, for a position of each of pixels constituting an image to be formed, whether or not to cause corresponding M light-emitting elements 602 to emit light. If a bit for a certain pixel position indicates "emission", a corresponding spot region on the surface of the photosensitive member 102 will be an exposed dot. If this bit indicates "non-emission", the corresponding spot region will be a non-exposed dot. The image data obtaining unit 801 outputs the generated image data to the light amount correction unit 802.

To suppress an unevenness in light amount per light-emitting element in the exposure head 106, the light amount correction unit 802 corrects the pixel values of the image data input from the image data obtaining unit 801 in accordance with correction data generated by a data generation unit 813 described below. The light amount correction unit 802 then outputs the corrected image data to the light emission control unit 803. The correction processing performed by the light amount correction unit 802 will be described below in detail.

The light emission control unit 803 controls light emission of each light-emitting element 602 in the light-emitting element array 201 in accordance with the corresponding pixel value of the corrected image data input from the light amount correction unit 802. In other words, the light emission control unit 803 controls turning on and off of the light-emitting elements 602 in accordance with the corrected image data. More specifically, the light emission control unit 803 reads pixel values within a corresponding read range in the corrected image data in each line period identified by the line synchronization signal Lsync, and sends image data indicating the read pixel values to the data signal line 807. The image data DATA is, for example, a sequence of pixel values corresponding to the respective light-emitting elements 602 of twenty light-emitting chips 400. The light emission control unit 803 designates which light-emitting chip 400 is to receive each portion of the image data DATA, by means of the chip select signal CS. The light emission control unit 803 generates the clock signal CLK and supplies the generated signal to each light-emitting chip 400 in order to achieve synchronization of timings of transmitting and receiving individual signal values with the light-emitting chip 400.

The synchronization signal generating unit 804 determines delimitation of a line of the image data, generates the line synchronization signal Lsync, and supplies the generated line synchronization signal Lsync to the synchronization signal line 808.

A storage unit 810 on the printed circuit board 202 is a memory or a register that stores control data for controlling light emission performed by the light-emitting chips 400. As will be described below, the control data stored in the storage unit 810 may include, for example, control data indicating the amount of electric current to be supplied to the light-emitting elements 602 in each light-emitting chip 400, and correction data to be used to correct image data by the light amount correction unit 802.

Each light-emitting chip 400 drives each of the light-emitting elements 602 in each line period identified by the line synchronization signal Lsync in accordance with the image data after correction of light amounts input from the light emission control unit 803. For example, when the chip select signal CS indicates a data reception timing for a certain light-emitting chip 400, this light-emitting chip 400 receives a portion of the image data DATA that is directed thereto via the data signal line 807. Each light-emitting chip 400 then drives each light-emitting element 602 in a light-emitting element array of M rows and N columns in accordance with the pixel value included in the received the image data.

<4-2. Current Supply to Light-Emitting Element>

Figure 9:
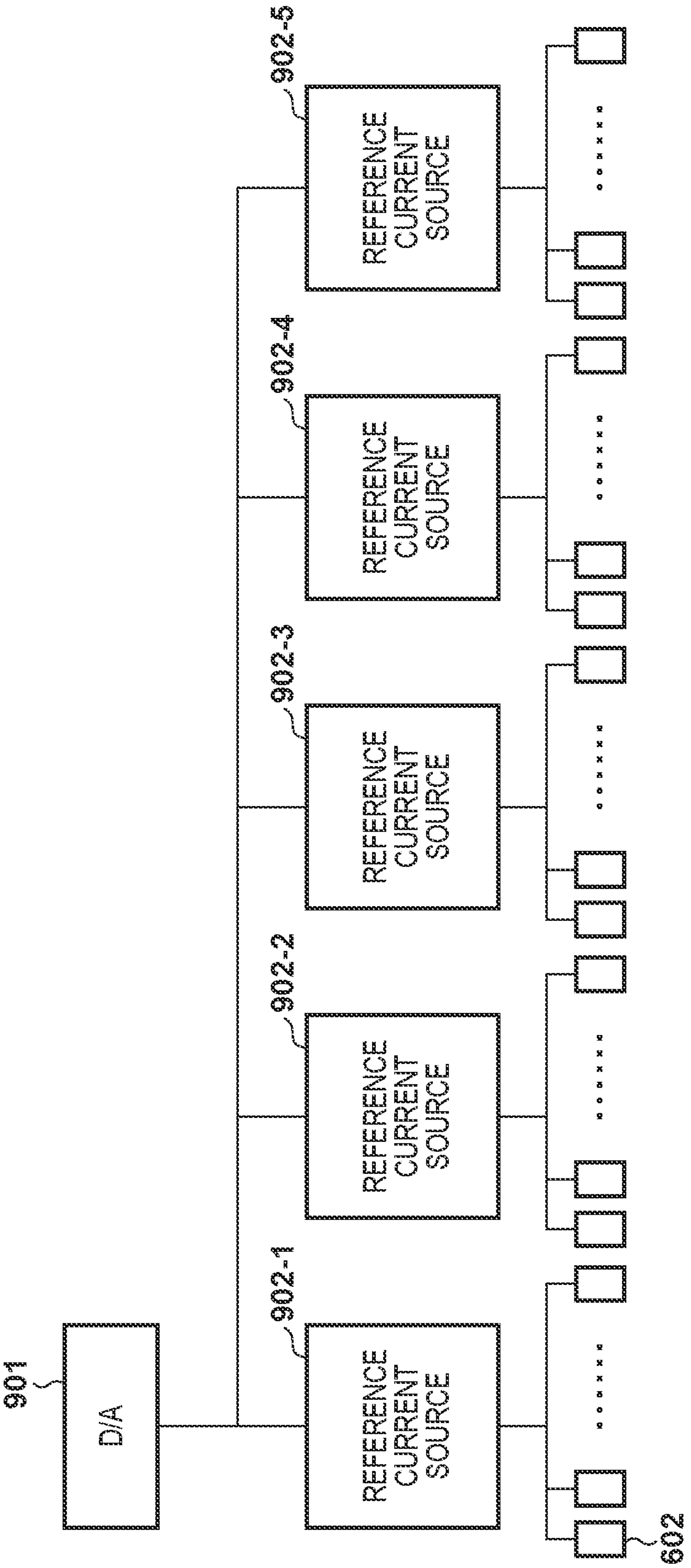
FIG. 9 is a block diagram showing a configuration of circuits related to current supplies in a light-emitting chip.

FIG. 9 is a block diagram showing a configuration of circuits related to current supplies in a light-emitting chip 400. Each light-emitting chip 400 is provided with a D/A 901, reference current sources 902-1 to 902-5, and a plurality of light-emitting elements 602. Each light-emitting element 602 is supplied with a current from any one of the reference current sources 902-1 to 902-5, depending on the position of the light-emitting element 602 in the axial direction.

The D/A 901 obtains control data for controlling the current amount that is generated by the data generation unit 813 described below, from the storage unit 810 of the printed circuit board 202. The D/A 901 then performs digital-to-analog conversion on a digital value of the current to be supplied from each reference current source 902, and outputs an analog signal having a voltage corresponding to that current amount to each reference current source 902. The current amount here may be, for example, the sum of an adjustment amount determined by the data generation unit 813 described below and a predetermined reference amount (common to a plurality of light-emitting chips 400). Each reference current source 902 supplies a current corresponding to the voltage of the analog signal input from the D/A 901 to the light-emitting elements 602 connected to the reference current source 902. Note that the number of reference current sources 902 provided in each light-emitting chip 400 is not limited to the example shown in FIG. 9, and may be any number of one or more depending on the interconnect length within the chip or the driving capacity of each reference current source 902.

<4-3. Calibration>

Referring again to FIG. 8, the CPU 811 controls the entire image-forming apparatus 1. For example, the CPU 811 controls generation of the aforementioned image data, light amount correction, generation of the line synchronization signal, and transmission of the image data to the printed circuit board 202. In the present embodiment, the CPU 811 also executes calibration using a correction chart in response to a request accepted via a user interface. Specifically, the CPU 811 may function as a measurement unit 812 and a data generation unit 813 in connection with the calibration.

(1) Measurement of Unevenness in Light Amount

The measurement unit 812 measures an unevenness in light amount in the exposure head 106 using a read image based on optical reading of an image of a correction chart formed on a sheet using the exposure head 106. For example, if a request for calibration is accepted, the measurement unit 812 causes the image-forming unit 101 to form an image of the correction chart on a sheet. It is assumed here that a uniform amount of current is supplied to all of the light-emitting elements 602 in the light-emitting element array 201 of the exposure head 106, and the light amount correction unit 802 does not perform correction processing. A user or an engineer sets the sheet with the image of the correction chart formed thereon in the reading unit 100, and the measurement unit 812 then gives the reading unit 100 an instruction to read the sheet. The reading unit 100 optically reads the image of the correction chart on the set sheet to generate a read image, and outputs the generated read image to the measurement unit 812. The measurement unit 812 measures an unevenness in light amount using the read image of the correction chart that is thus obtained from the reading unit 100.

Figure 10:
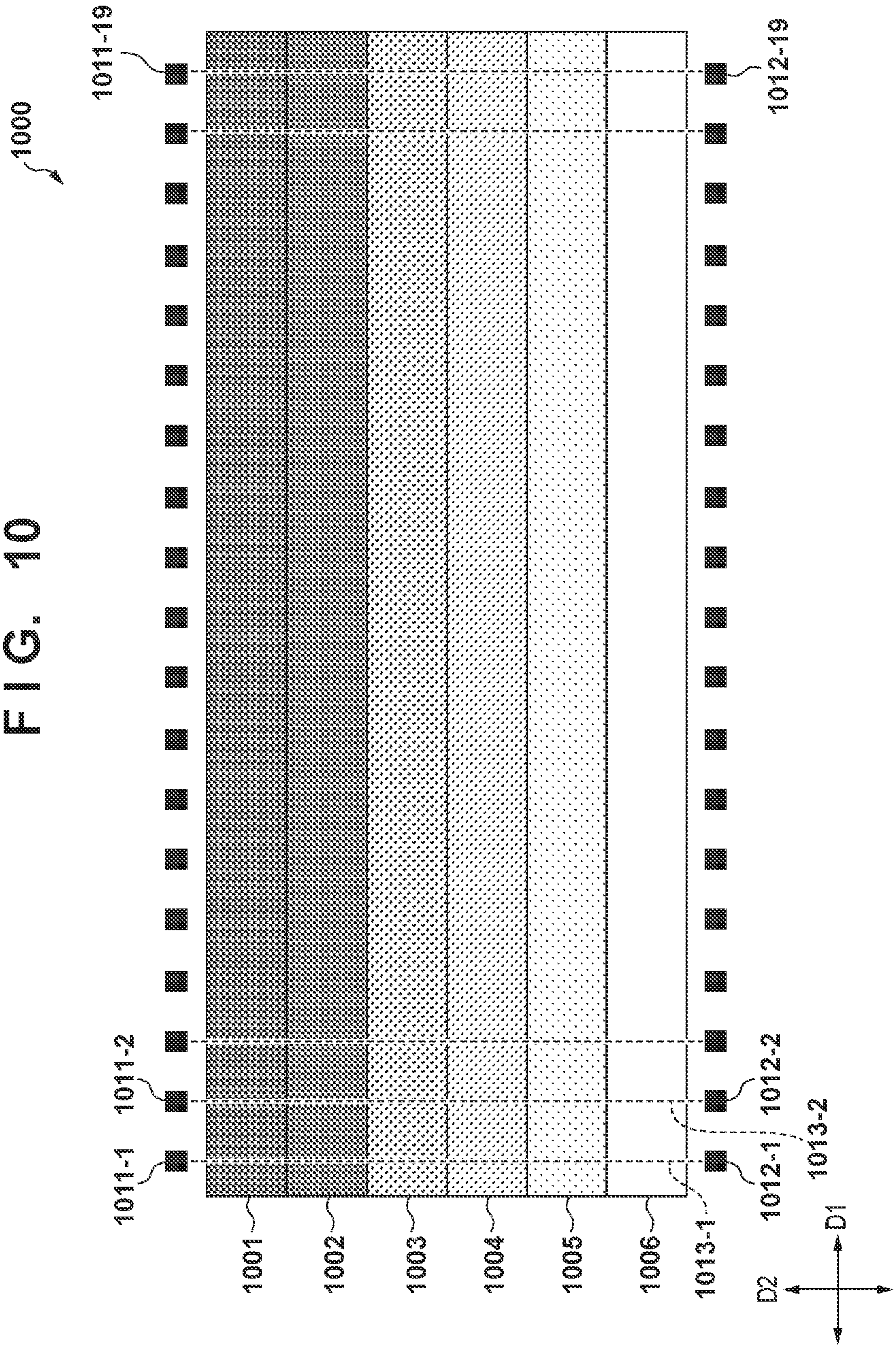
FIG. 10 is an illustrative diagram regarding an example of a configuration of a correction chart to be used to measure an unevenness in light amount.

FIG. 10 shows an example of a configuration of the correction chart to be used to measure the unevenness in light amount. Referring to FIG. 10, the correction chart 1000 includes a plurality of band-shaped regions 1001 to 1006, each of which is a rectangular region having a longitudinal direction that is the axial direction D1. The band-shaped regions 1001 to 1006 have different gradations and are arranged side by side in a circumferential direction D2 orthogonal to the axial direction D1. The gradations of the band-shaped regions 1001 and 1002 belong to a high gradation range. The gradations of the band-shaped regions 1003 and 1004 belong to a medium gradation range. The gradations of the band-shaped regions 1005 and 1006 belong to a low gradation range.

The correction chart 1000 includes at least one first reference mark, namely first reference marks 1011-1 to 1011-19 located on one side (upper side in the figure) of the band-shaped regions 1001 to 1006 in the circumferential direction D2. In addition, the correction chart 1000 includes at least one second reference mark, namely second reference marks 1012-1 to 1012-19 located on the other side (lower side in the figure) of the band-shaped regions 1001 to 1006 in the circumferential direction D2. The first reference marks 1011-1 to 1011-19 and the second reference marks 1012-1 to 1012-19 may be formed by light emission by effective light-emitting elements at least at one end of each light-emitting chip 400 in the axial direction D1. For example, the first reference mark 1011-1 and the second reference mark 1012-1 may be formed as a result of four effective light-emitting elements 602 at the right end of the light-emitting chip 400-1 emitting light. The first reference mark 1011-2 and the second reference mark 1012-2 may be formed as a result of four effective light-emitting elements 602 at the right end of the light-emitting chip 400-2 emitting light. As a result, a line segment connecting representative positions of a first reference mark 1011-*p* and a second reference mark 1012-*p* to each other substantially coincides with a boundary between chips. For example, broken lines 1013-1 and 1013-2 in the figure correspond to such boundaries.

The measurement unit 812 determines the representative position of each reference mark in the read image of the correction chart 1000, and recognizes where in the band-shaped regions 1001 to 1006 each of the boundaries between the light-emitting chips 400 is located based on the line segments connecting the determined representative positions. The representative position here may be, for example, the center of gravity of each reference mark, one of the vertices, or the position of an end point in the axial direction D1, depending on the shape of the mark. Then, the measurement unit 812 measures the density distribution in each band-shaped region that represents a change in density per light-emitting chip and per light-emitting element, using the recognized boundary position as a reference. Note that the relationship between the density and the light amount is expressed by density-light amount characteristics that are experimentally determined in advance. Accordingly, the measurement unit 812 can convert the measured density distribution to a light amount distribution using a predefined conversion formula from density to light amount. The light amount distribution thus derived by the measurement unit 812 indicates the light amount of each light-emitting element (or at each corresponding pixel position), and a spatial variation of the light amount distribution represents an unevenness in light amount.

(2) Adjustment of Current Amount

The data generation unit 813 generates the aforementioned control data and correction data so as to suppress the unevenness in light amount appearing in the light amount distribution of the exposure head 106 measured by the measurement unit 812. Specifically, first, the data generation unit 813 determines an adjustment amount for the current to be supplied by each of the one or more current sources in each light-emitting chip 400. For example, the data generation unit 813 may determine the adjustment amount for the current to be supplied by each current source, based on a difference between a target light amount and a light amount measured for a specific light-emitting element selected from among light-emitting elements 602 connected to the current source. The specific light-emitting element here may be, for example, a light-emitting element with the lowest output light amount among the light-emitting elements 602 to which the current is supplied. The light-emitting element 602 with the lowest output light amount (output performance) may be predetermined by an optical measurement test at the manufacturing stage of the apparatus. The data generation unit 813 stores control data indicating the current adjustment amount (or adjusted current amount) determined for each light-emitting chip 400 in the storage unit 810 of the printed circuit board 202. The unevenness in light amount between different light-emitting chips 400 are roughly eliminated by thus adjusting the current amount supplied from the reference current sources 902 to the light-emitting elements 602 in each light-emitting chip 400.

(3) Correction of Input Image Data

Furthermore, the data generation unit 813 determines a correction amount per pixel position in the image data so as to suppress a residual component of the unevenness in light amount that remains after adjusting the current supplied in each light-emitting chip 400, and generates correction data indicating the determined correction amount. In other words, the data generation unit 813 generates correction data for use in increasing or decreasing the number of light-emitting elements 602 to be turned on based on a correction amount for correcting unevenness in light amount. The correction data generated by the data generation unit 813 is stored in the storage unit 810 of the printed circuit board 202, and is used by the light amount correction unit 802 during later image formation.

In the present embodiment, the correction processing executed by the light amount correction unit 802 includes changing an areal light amount in an image region including a pixel of interest and neighboring pixels, for each pixel of interest in the image data, in accordance with the correction amount indicated by the correction data. Accordingly, the correction data generated by the data generation unit 813 indicates a correction amount that is determined in terms of a change rate in the areal light amount for each pixel.

Figure 11A:
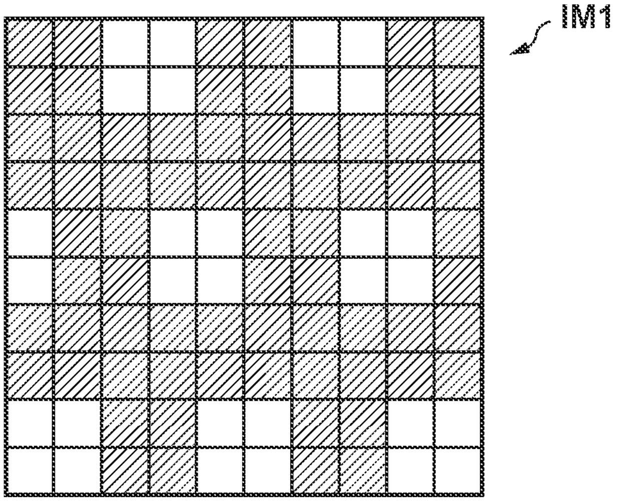
FIG. 11A is a first illustrative diagram regarding a method for suppressing an unevenness in light amount by locally changing an areal gradation.

A description will be given below of a method for suppressing an unevenness in light amount by locally changing the areal light amount, with reference to FIGS. 11A to 11C. FIG. 11A shows, as an example, a small image around a certain reference pixel position represented by pre-correction image data. One square in the figure corresponds to one pixel. Shaded pixels represent that a corresponding spot region is an exposed dot, i.e., corresponding M light-emitting elements emit light. White pixels indicate that a corresponding spot region is a non-exposed dot, i.e., corresponding M light-emitting elements do not emit light. Here, an x-th pixel position from the left and a y-th pixel position from the top are denoted as (x, y), with respect to the upper left pixel of the small image.

Figure 11B:
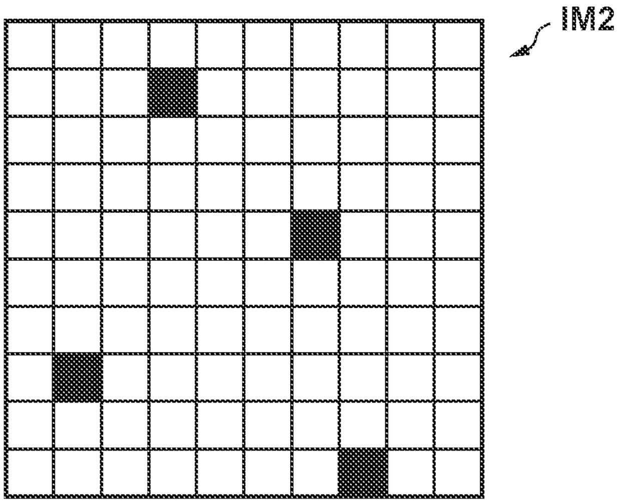
FIG. 11B is a second illustrative diagram regarding a method for suppressing an unevenness in light amount by locally changing the areal gradation.
Figure 11C:
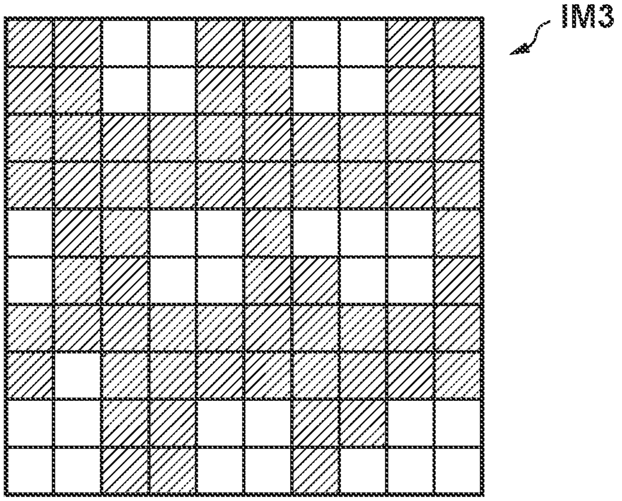
FIG. 11C is a third illustrative diagram regarding a method for suppressing an unevenness in light amount by locally changing the areal gradation.

FIG. 11B shows a correction matrix IM2 as an example. The correction matrix IM2 is a matrix (bitmap) of the same size as the small image IM1, where one square in the figure corresponds to one element. Shaded elements represent pixels to be changed that are selected based on the calibration results. There may be two types of correction matrices, one for reducing the light amount and the other for increasing the light amount, and the correction matrix IM2 is a matrix for reducing the light amount. As an example, if the light amount at the reference pixel position is to be reduced by 4% relative to a maximum value, four pixels out of a total of 100 (=10×10) pixels are selected as the pixels to be changed. In the example in FIG. 11B, pixels at pixel positions (4, 2), (7, 5), (2, 8) and (8, 10) are selected as the pixels to be changed. The pixel position of a pixel to be changed may be selected in accordance with the publicly-known blue noise masking method, for example.

If a pixel at the same position as a pixel to be changed that is selected in the correction matrix IM2 indicates an exposed dot in the small image IM1, the light amount correction unit 802 changes this pixel to a non-exposed dot (i.e. inverts the pixel value). FIG. 11C shows an example of the results of correcting the small image IM1 using the correction matrix IM2. In a small image IM3 shown in FIG. 11C, the pixels at the pixel positions (7, 5), (2, 8) and (8, 10), which are exposed dots in the small image IM1, are changed to non-exposed dots. As a result, the local areal light amount in the small image IM3 is decreased from the small image IM1. In the case of increasing the light amount at the reference pixel position, if a pixel at the same position as a selected pixel to be changed indicates a non-exposed dot in the small image IM1, the light amount correction unit 802 changes this pixel to an exposed dot.

Although an example in which the size of the small image is 10×10 pixels has been described here, the present embodiment is not limited to this example. If, for example, a pixel to be changed is selected in accordance with the blue noise masking method, setting the size of the small image to a larger size, for example 128×128 pixels or 256×256 pixels, can spread the spatial frequency more randomly and significantly suppress interference moiré.

The data generation unit 813 calculates a residual component, remaining after adjusting the supply current, of the unevenness in light amount measured for each pixel position, and determines a correction amount corresponding to the calculated residual component (e.g., so as to be able to cancel out or at least suppress the residual component). The data generation unit 813 then generates correction data indicating the correction amount (rate of change in the areal light amount) determined for each pixel position, and stores the generated correction data in the storage unit 810.

In one example, the correction data may be a simple correction amount list indicating the correction amount per pixel position in the main scanning direction. In another example, the correction data may include, for example, the following two types of data items.

- Light amount correction value A: a value of the correction amount per group of light-emitting elements that are supplied with a current from the same reference current source 902; and
- Light amount correction value B: a value of the correction amount per light-emitting element.
- Generally, the variation in the light amount among light-emitting elements 602 that are supplied with a current from the same reference current source 902 is small, and thus, the data size of the entire correction data can be kept small by thus writing the correction amount separately for the two types of data items with different granularities.

During image formation, the light amount correction unit 802 repeatedly changes the pixel values of small images around each reference pixel position in accordance with the correction amount (e.g., light amount correction value A+B) indicated by the correction data while scanning the reference pixel positions in the input image data along the main scanning direction. Thus, the residual component (per pixel or per light-emitting element) of the unevenness in light amount remaining after adjusting the supply current is suppressed.

In yet another example, the correction data may also include an additional data item, i.e., a spot correction value C. For example, if the spot size on an imaging plane of light from the exposure head 106 enlarges due to manufacturing variations, the density of a printed image in a low gradation range becomes lower relative to an equivalent gradation value due to an insufficient light amount. Meanwhile, if the spot size enlarges, the density of a printed image in a high gradation range becomes higher relative to an equivalent gradation value due to adjoining spots being squished. In the following description, an imaging spot with an enlarged size is referred to as an abnormal spot. The density in a medium gradation range is hardly affected by the abnormal spot. Therefore, the data generation unit 813 can detect abnormal spots from the density distribution in the respective gradation ranges in the read image of the correction chart 1000 described with reference to FIG. 10, and determine the position and spot size of each abnormal spot. The spot correction value C may indicate the position of each of the thus-detected abnormal spots and a spot shift amount (a difference between a reference value and the spot size) at each abnormal spot.

Figure 12:
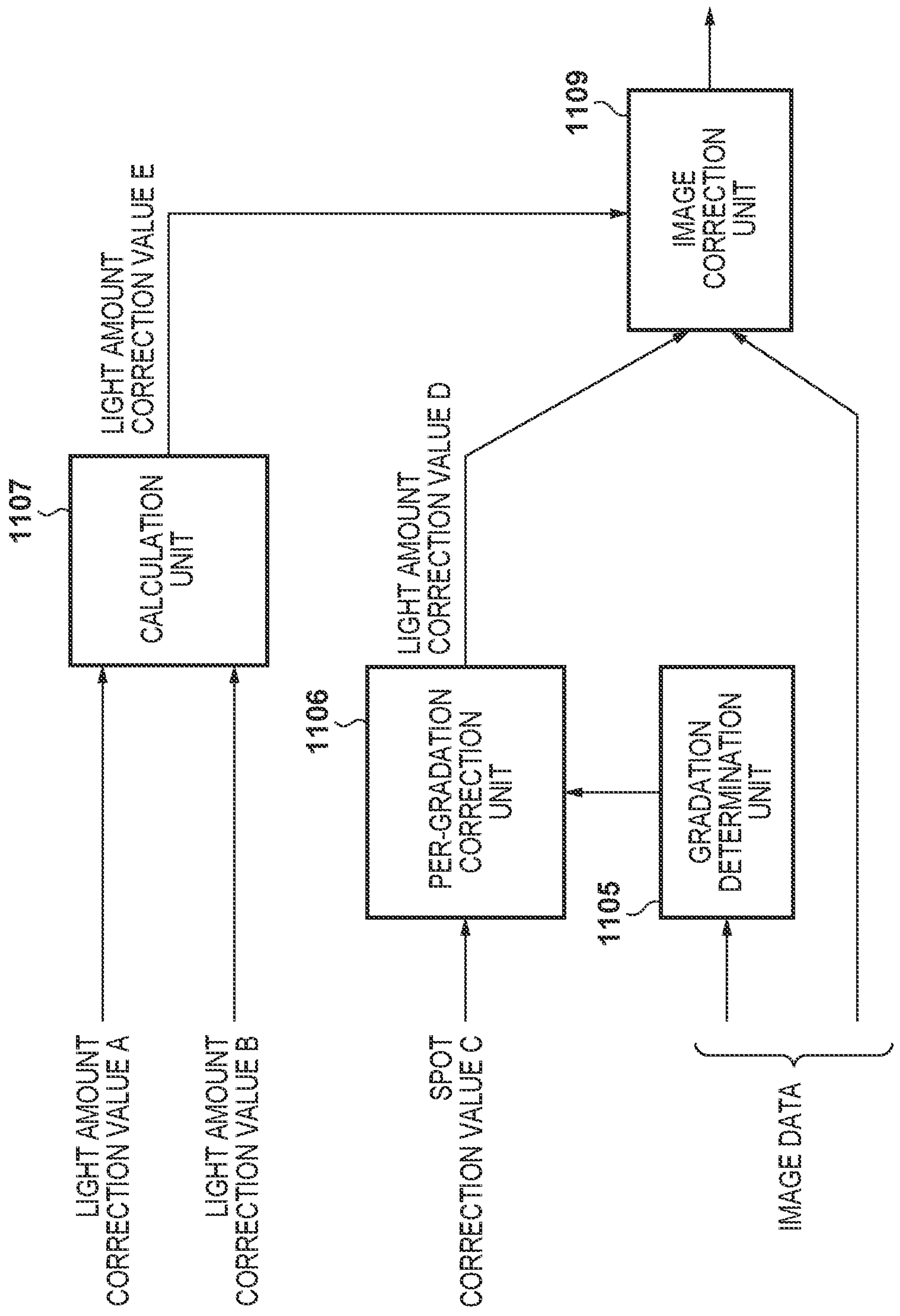
FIG. 12 is a block diagram showing a practical example of a detailed configuration of a light amount correction unit according to an embodiment.

FIG. 12 shows a practical example of a detailed configuration of the light amount correction unit 802 in the case where the correction data includes the light amount correction value A, the light amount correction value B, and the spot correction value C. Referring to FIG. 12, the light amount correction unit 802 includes a gradation determination unit 1105, a per-gradation correction unit 1106, a calculation unit 1107, and an image correction unit 1109.

The gradation determination unit 1105 determines a gradation range at each pixel position based on the input image data. For example, the gradation determination unit 1105 focuses on a patch image that includes a pixel (pixel of interest) at each pixel position and neighboring pixels, and determines whether the gradation of the pixel of interest belongs to the low gradation range, the medium gradation range, or the high gradation range, based on areal gradation (e.g. average pixel value) in the patch image. For example, if the areal gradation in the patch image is greater than a first threshold, the gradation range of the pixel of interest is classified as the high gradation range. If the areal gradation in the patch image is smaller than or equal to the first threshold and greater than a second threshold (first threshold>second threshold), the gradation range of the pixel of interest is classified as the medium gradation range. If the areal gradation in the patch image is smaller than or equal to the second threshold, the gradation range of the pixel of interest is classified as the low gradation range. The gradation determination unit 1105 notifies the per-gradation correction unit 1106 of the results of determining the gradation range for each pixel position.

The per-gradation correction unit 1106 has a correction table that holds a reference light amount correction value, which is predetermined for each of the high gradation range, the medium gradation range, and the low gradation range. Generally, the reference light amount correction value for the high gradation range indicates a negative light amount correction value, and the sign thereof being negative means that the light amount is to be decreased. The reference light amount correction value for the low gradation range indicates a positive light amount correction value, and the sign thereof being positive means that the light amount is to be increased. The reference light amount correction value for the medium gradation range may be zero. The per-gradation correction unit 1106 obtains, by referencing the correction table, the reference light amount correction value corresponding to the gradation range of which the per-gradation correction unit 1106 was notified by the gradation determination unit 1105 for each of the pixel positions of abnormal spots indicated by the spot correction value C. Next, the per-gradation correction unit 1106 calculates a light amount correction value D based on the obtained reference light amount correction value and the spot shift amount indicated by the spot correction value C. For example, the light amount correction value D may be the product of the reference light amount correction value and a coefficient corresponding to the spot shift amount. To calculate the light amount correction value D, the per-gradation correction unit 1106 may also have a coefficient table or a relational expression that defines a relationship between the spot shift amount and the coefficient. The per-gradation correction unit 1106 then outputs the calculated light amount correction value D to the image correction unit 1109. Note that the light amount correction value D may be zero for a pixel position where no abnormal spot is detected.

The calculation unit 1107 calculates a light amount correction value E for each pixel position based on the light amount correction value A and the light amount correction value B. The light amount correction value E may be the sum of the light amount correction value A determined for the group to which the light-emitting element 602 corresponding to each pixel position belongs and the light amount correction value B determined for this light-emitting element 602. Typically, the light amount correction value E may be zero or a negative value. The calculation unit 1107 outputs the calculated light amount correction value E to the image correction unit 1109.

The image correction unit 1109 determines a percentage of scaling the light amount at each pixel position based on the light amount correction value D input from the per-gradation correction unit 1106 and the light amount correction value E input from the calculation unit 1107. The image correction unit 1109 then increases or decreases the areal light amount at each pixel position by changing the pixel values of a small image around the pixel position in accordance with the method that has been described in detail with reference to FIGS. 11A to 11C. Then, the image correction unit 1109 outputs the corrected image data to the light emission control unit 803.

In the present embodiment, a residual difference in an unevenness in light amount is suppressed per light-emitting element by changing the pixel values of the image data before the data is output from the light emission control unit 803 to each light-emitting chip 400. Accordingly, the light emission control unit 803 can distribute the image data to each light-emitting chip 400 using a common control logic without being affected by the unevenness in light amount.

<4-4. Limit for Correction Amount>

The light amount for exposure of the photosensitive member 102 can be finely adjusted by the method of locally changing the areal gradation described with reference to FIGS. 11A to 11C. However, if the pixel values of the image data are excessively corrected, there is a risk that the shapes of dots formed on the photosensitive member 102 greatly change, which may result in image deterioration. In the present embodiment, the data generation unit 813 determines the correction amount per pixel position such that the correction amount does not exceed a predetermined limit value. Similar to the correction amount, the limit value here may be expressed in terms of the rate of change in the areal light amount in the correction processing performed by the light amount correction unit 802. The limit value may be set to any value by giving consideration to a trade-off between suppressing the unevenness in light amount and preserving the dot shape. As an example, the limit value may be ±30%. Different limit values may be set for the reduction and the increase in the areal light amount.

Specifically, the data generation unit 813 determines, for each pixel position, whether or not a first correction amount corresponding to the residual component of the unevenness in light amount remaining after the current adjustment exceeds a preset limit value. The first correction amount is typically a value that can cancel out the residual component. The data generation unit 813 determines the correction amount at a pixel position at which the first correction amount does not exceed the limit value to be the first correction amount. Meanwhile, the data generation unit 813 determines the correction amount at a pixel position at which the first correction amount exceeds the limit value to be a second correction amount, which is smaller than or equal to the limit value. The second correction amount may be, for example, equal to the limit value.

Figure 13A:
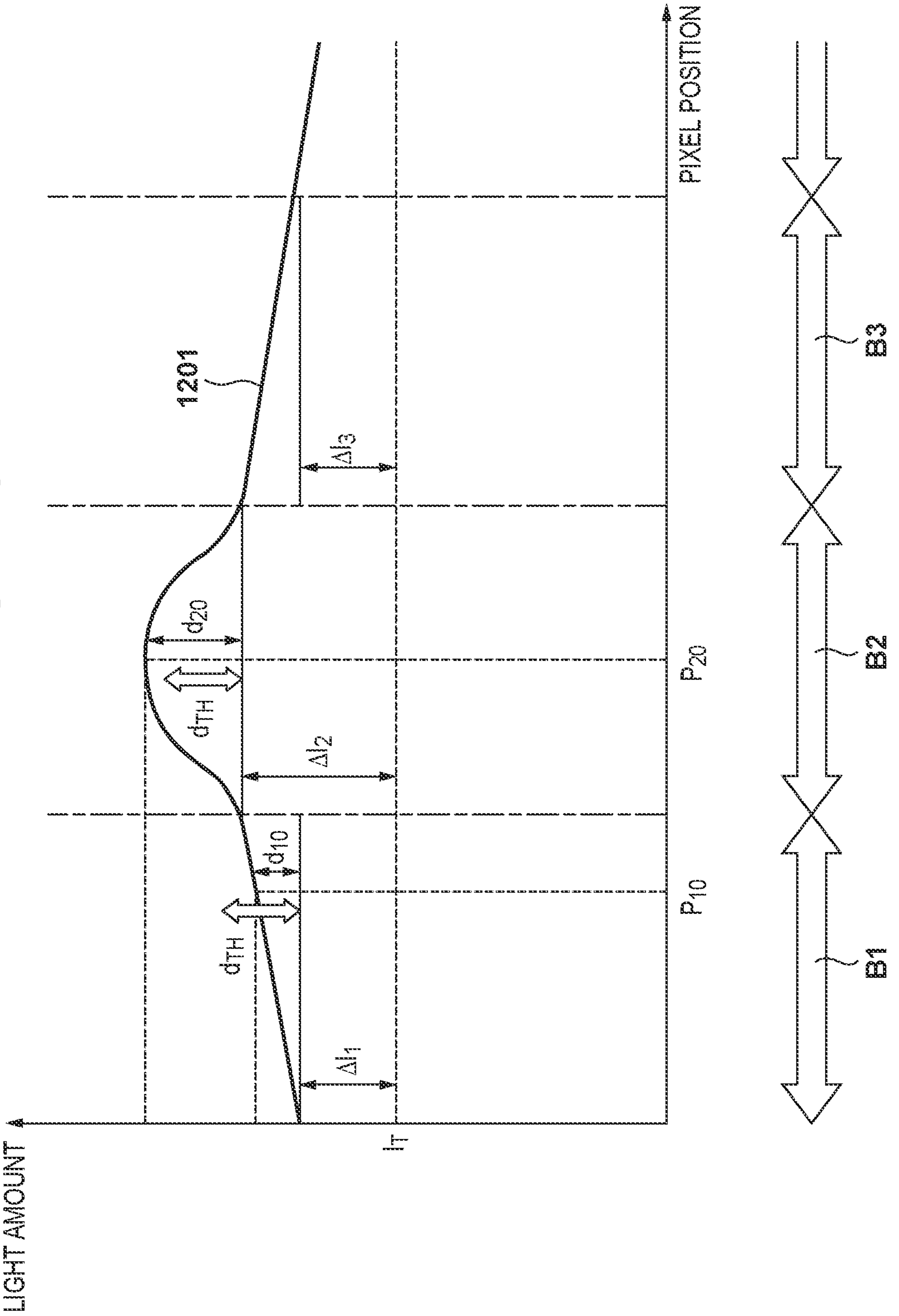
FIG. 13A is an illustrative diagram regarding a current adjustment amount and a correction amount in a first example of a light amount distribution.
Figure 13B:
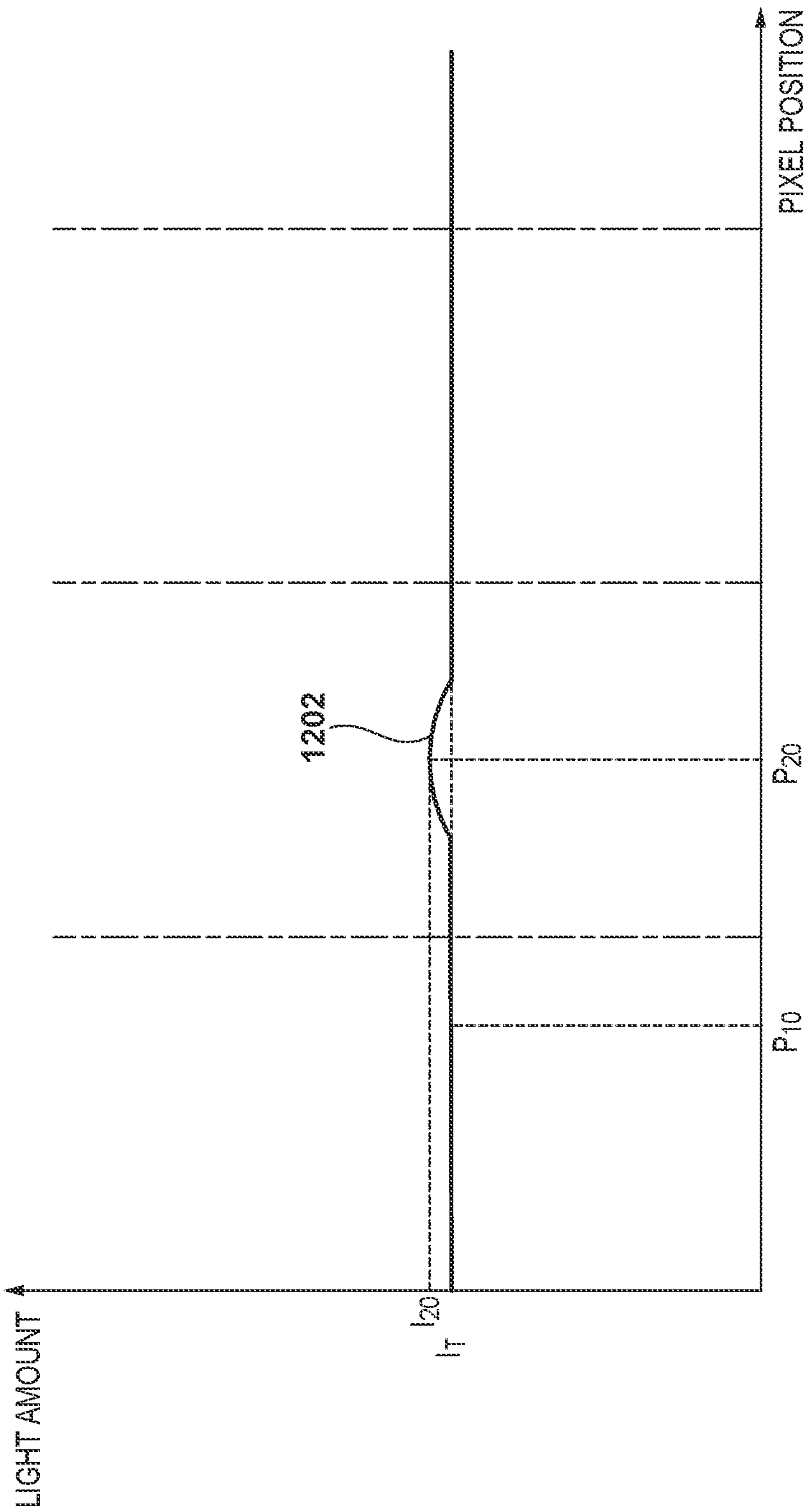
FIG. 13B is an illustrative diagram showing a suppressed unevenness in light amount in the first example of the light amount distribution.

FIGS. 13A and 13B are illustrative diagrams regarding the current adjustment amount and the correction amount in a first example of a light amount distribution. A graph 1201 in FIG. 13A partially shows a light amount distribution as an example, which is the result of measuring an unevenness in light amount. The horizontal axis of the graph represents the pixel position in the main scanning direction, and the vertical axis represents the measured light amount. A light amount $I_T$ is a target light amount. A section B1 on the horizontal axis corresponds to the light-emitting chip 400-1 located at one end in the longitudinal direction of the light-emitting element array. A section B2 corresponds to the light-emitting chip 400-2 adjacent to the light-emitting chip 400-1 in the longitudinal direction of the light-emitting element array. A section B3 corresponds to the light-emitting chip 400-3 adjacent to the light-emitting chip 400-2 in the longitudinal direction of the light-emitting element array. The graph in sections corresponding to the light-emitting chips 400-4 to 400-20 is omitted.

For example, the data generation unit 813 determines the adjustment amount for the current to be supplied to the light-emitting chip 400-1 to be $\Delta I_1$, based on a light-emitting element at the left end that has the lowest light amount in the section B1. Similarly, the data generation unit 813 determines the adjustment amounts for the current to be supplied to the light-emitting chips 400-2 and 400-3 to be $\Delta I_2$ and $\Delta I_3$, respectively.

For example, for a pixel position $P_{10}$ belonging to the section B1, a correction amount $d_{10}$ for canceling out the residual component of the unevenness in light amount does not exceed the preset limit value $d_{TH}$. Thus, the data generation unit 813 determines the correction amount at the pixel position $P_{10}$ to be $d_{10}$. Meanwhile, for a pixel position $P_{20}$ belonging to the section B2, a correction amount $d_{20}$ for canceling out the residual component of the unevenness in light amount exceeds the limit value $d_{TH}$ instead of $d_{20}$. Thus, the data generation unit 813 determines the correction amount at the pixel position $P_{20}$ to be $d_{TH}$. The data generation unit 813 also determines the correction amounts for the other pixel positions in the same manner.

A graph 1202 in FIG. 13B shows a light amount distribution with the unevenness in light amount suppressed as a result of performing light emission control in accordance with the current adjustment amount per light-emitting chip 400 and the correction amount per pixel position as mentioned above. As seen in the graph 1202, the light amount coincides with the target light amount $I_T$ at many pixel positions, including the pixel position $P_{10}$, and a substantially uniform light amount distribution is achieved. However, a light amount $I_{20}$ at the pixel position $P_{20}$ slightly exceeds the target light amount $I_T$ as a result of priority given to preserving the dot shape over suppressing the unevenness in light amount. As a consequence, image degradation caused by deformation of the dot shape is also prevented.

Figure 14A:
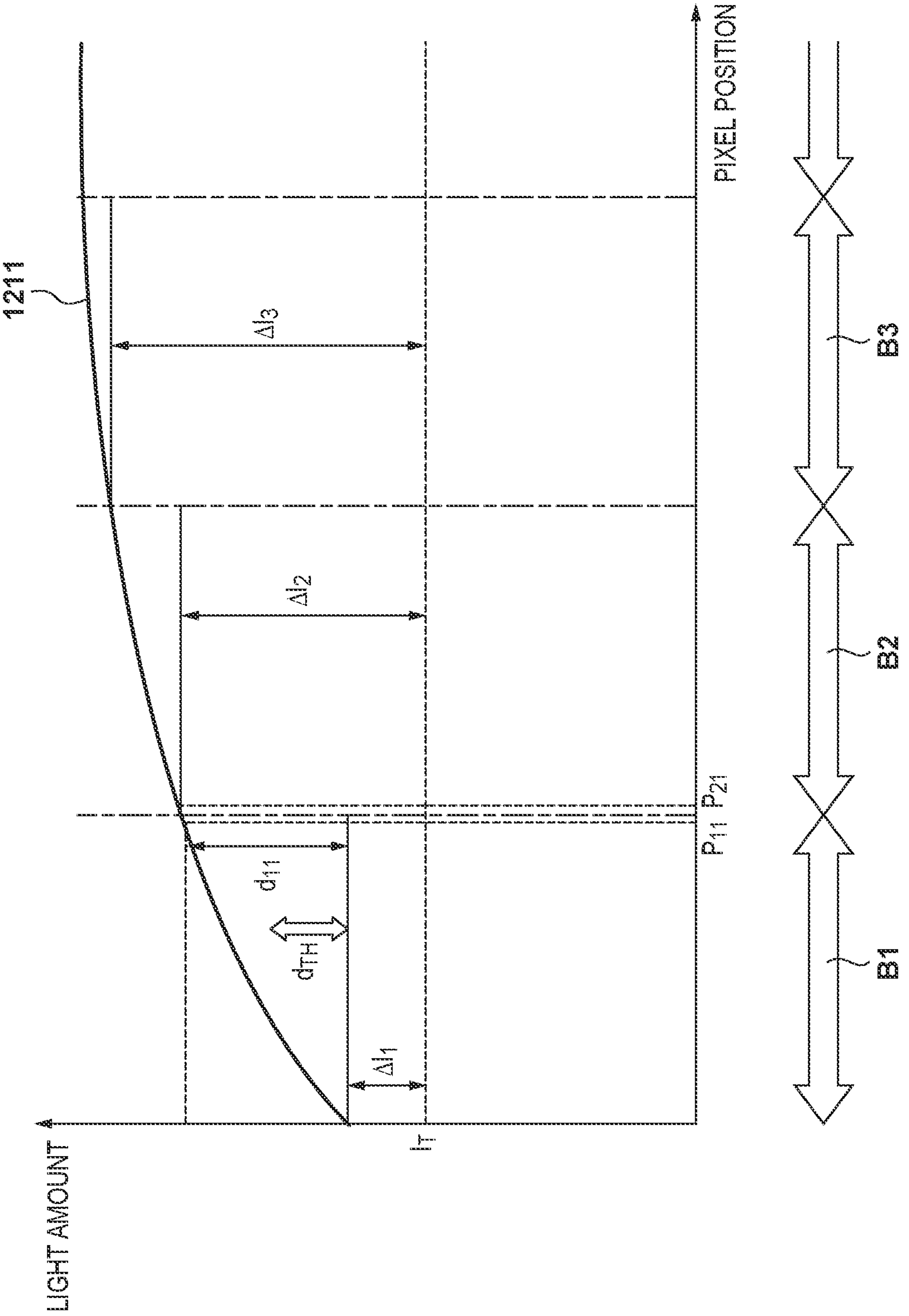
FIG. 14A is an illustrative diagram regarding the current adjustment amount and the correction amount in a second example of a light amount distribution.
Figure 14B:
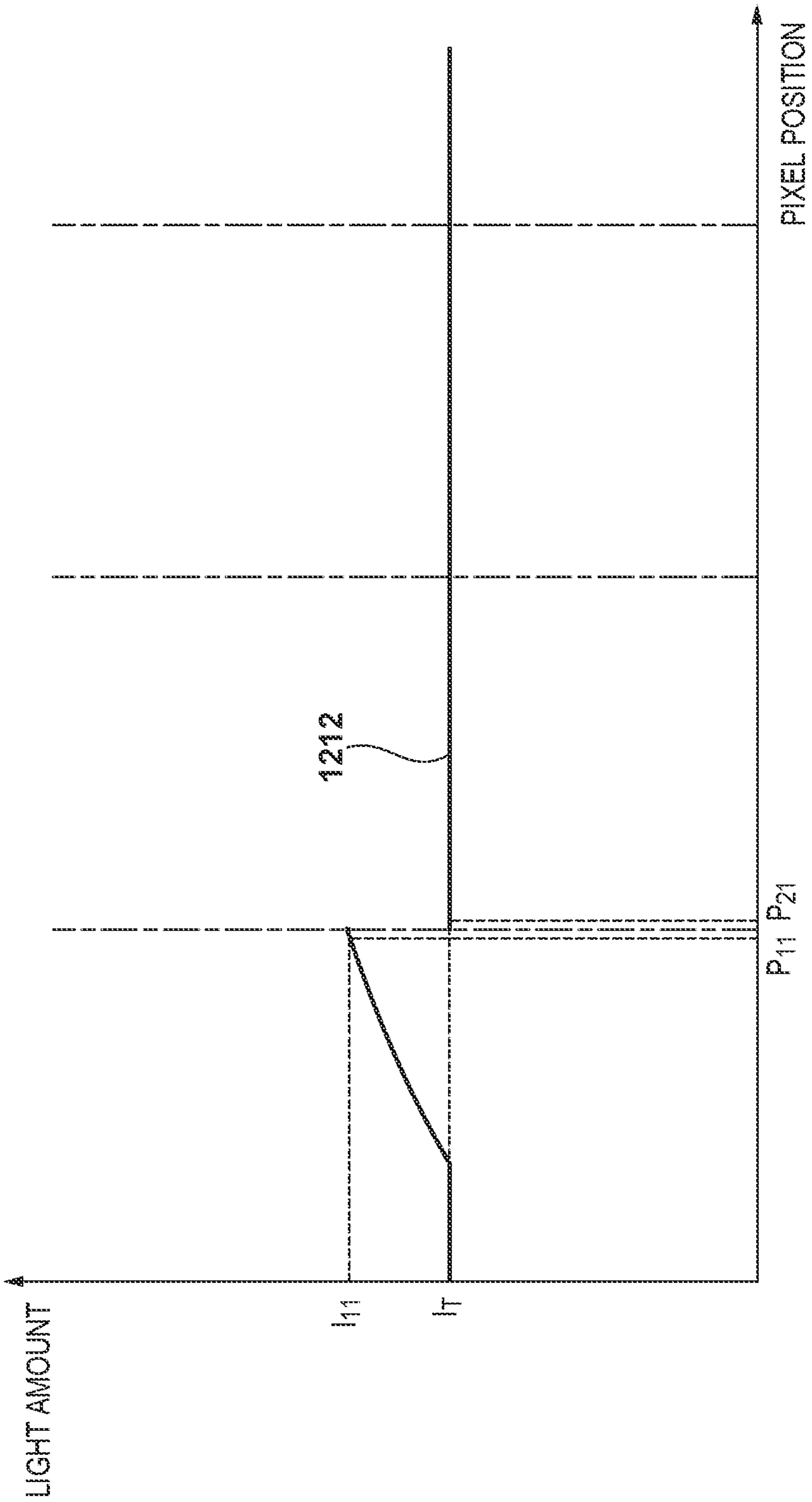
FIG. 14B is an illustrative diagram showing a suppressed unevenness in light amount in the second example of the light amount distribution.

FIGS. 14A and 14B are illustrative diagrams regarding the current adjustment amount and the correction amount in a second example of a light amount distribution. A graph 1211 in FIG. 14A partially shows a light amount distribution as an example, which is the result of measuring an unevenness in light amount. Similar to the example in FIG. 13A, the data generation unit 813 determines the adjustment amounts for the current to be supplied to the light-emitting chips 400-1, 400-2, and 400-3 to be $\Delta I_1$, $\Delta I_2$ and $\Delta I_3$ (these values are different from the first example), respectively.

Further, for a pixel position $P_{11}$ belonging to the section B1, a correction amount $d_{11}$ for canceling out the residual component of the unevenness in light amount exceeds the limit value $d_{TH}$. Thus, the data generation unit 813 determines the correction amount at the pixel position $P_{11}$ to be $d_{TH}$ instead of $d_{11}$. The pixel position $P_{11}$ is located at the right end of the section B1, i.e., corresponds to a rightmost effective light-emitting element of the light-emitting chip 400-1 (a light-emitting element adjacent to the light-emitting chip 400-2). Meanwhile, at a pixel position $P_{21}$ belonging to the section B2, the residual component of the unevenness in light amount is equal to zero, and the correction amount at the pixel position $P_{21}$ is therefore determined to be zero. The pixel position $P_{21}$ is located at the left end of the section B2, i.e., corresponds to a leftmost effective light-emitting element of the light-emitting chip 400-2 (a light-emitting element adjacent to the light-emitting chip 400-1).

A graph 1202 in FIG. 14B shows a light amount distribution with the unevenness in light amount suppressed as a result of performing light emission control in accordance with the current adjustment amount per light-emitting chip 400 and the correction amount per pixel position as mentioned above. In the graph 1212 as well, the light amount coincides with the target light amount $I_T$ at many pixel positions, but the light amount exceeds the target light amount $I_T$ in a part of the section B1, including the pixel position $P_{11}$.

In the example in FIG. 14B, the unevenness in light amount is suppressed overall, but there is discontinuity in light amount at a chip boundary between the light-emitting chip 400-1 and the light-emitting chip 400-2. This type of discontinuity in light amount appears in a printed image as a noticeable density variation that is easily recognized visually by users.

In another example, the data generation unit 813 determines the adjustment amount for the current to be supplied by the current source of the light-emitting chip 400-*k*, based further on a correction amount that is determined for a pixel position corresponding to a rightmost light-emitting element of a light-emitting chip 400-(*k*−1). Note that, here, the left side corresponds to the upstream side in the main scanning direction. The light-emitting chip 400-(*k*−1) is therefore a light-emitting chip on the left side of the light-emitting chip 400-*k*. In the following, a rightmost effective light-emitting element of the light-emitting chip 400-(*k*−1) neighboring a boundary between the light-emitting chip 400-(*k*−1) and the light-emitting chip 400-*k* is referred to as a first light-emitting element, and a leftmost effective light-emitting element of the light-emitting chip 400-*k* neighboring the same boundary is referred to as a second light-emitting element. The pixel position corresponding to the first light-emitting element is referred to as a first pixel position, and the pixel position corresponding to the second light-emitting element is referred to as a second pixel position. In the example in FIGS. 14A and 14B, the pixel position $P_{11}$ is the first pixel position, and the pixel position $P_{21}$ is the second pixel position. If the second correction amount that does not substantially cancel out the residual component of the unevenness in light amount is determined to be the correction amount at the first pixel position, the data generation unit 813 determines the current adjustment amount for the light-emitting chip 400-*k* so as not to cause a significant difference in light amount between the first light-emitting element and the second light-emitting element. For example, in the example in FIG. 14A, the adjustment amount for the current to be supply by the current source of the light-emitting chip 400-2 may be modified to a value obtained by subtracting the adjustment amount corresponding to a gap $d_{11}$-$d_{TH}$ in the correction amount from $\Delta I_2$. As a result, the light amount at the second pixel position $P_{21}$ becomes equal to the light amount $I_{11}$ rather than the target light amount $I_T$. When the light-emitting element array 201 includes three or more light-emitting chips 400, the data generation unit 813 first determines an adjustment amount for the current to be supplied by the current source of the light-emitting chip 400-1, independently of correction amounts determined for the other light-emitting chips 400. The data generation unit 813 then determines an adjustment amount for the current to be supplied by the current source of each of the light-emitting chip 400-2 and the subsequent light-emitting chips 400, in order from upstream to downstream in the main scanning direction, depending on the correction amount determined for a light-emitting element of another light-emitting chip 400 (the upstream one).

Figure 15:
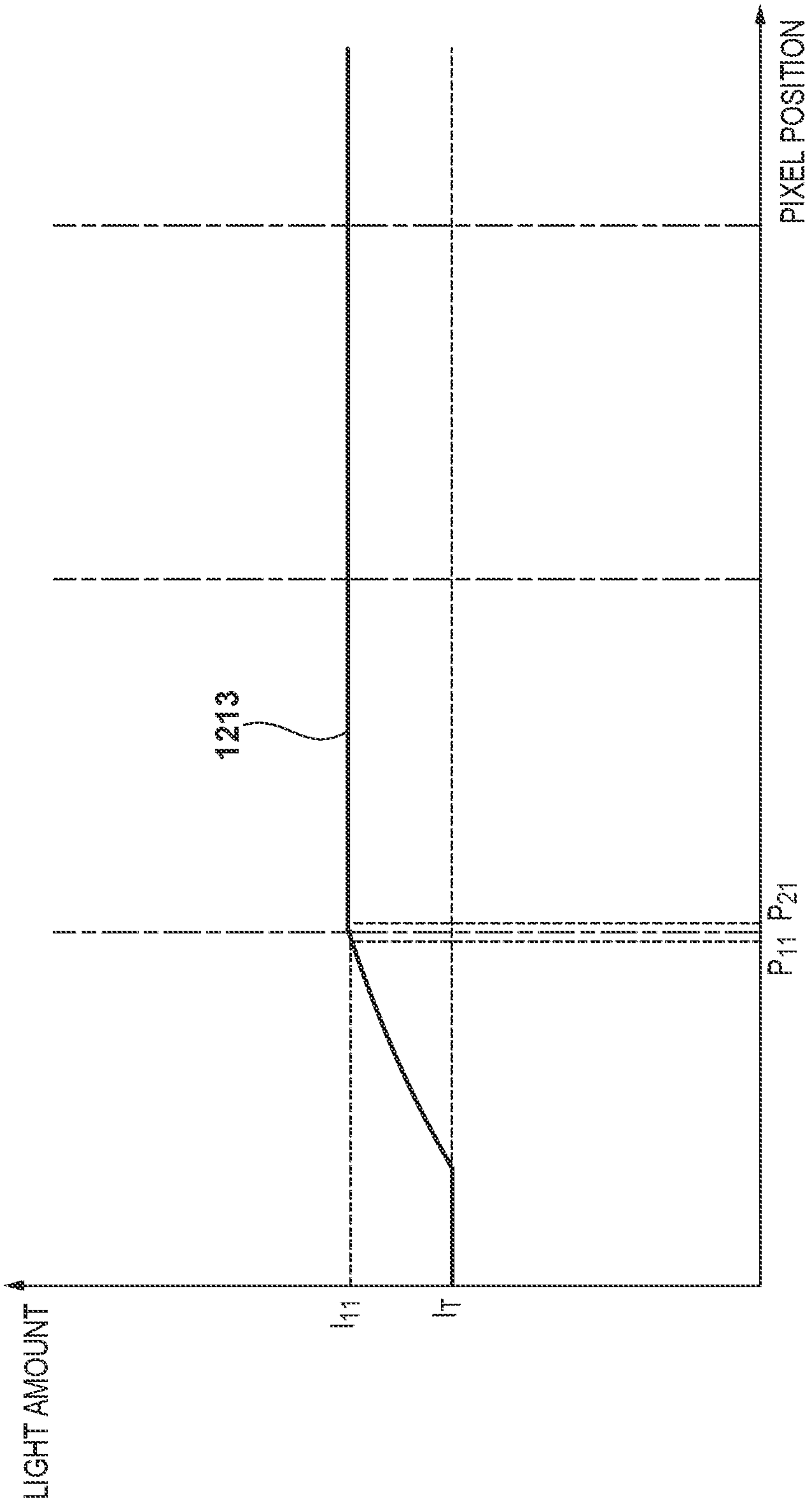
FIG. 15 is an illustrative diagram showing an unevenness in light amount that is suppressed so as not to cause a significant difference in light amount at a chip boundary.

FIG. 15 shows, in relation to the second example of the light amount distribution, the unevenness in light amount that is suppressed so as not to cause a significant difference in light amount at the chip boundary in the above-described example. Comparing the graph 1212 in FIG. 14B to a graph 1213 in FIG. 15, the discontinuity in the light amount that appears at the chip boundary between the first pixel position $P_{11}$ and the second pixel position $P_{12}$ in the graph 1212 is eliminated in the graph 1213. In the graph 1213, the light amount (or the density in the image) is not completely uniform but only shows a gradual change. It is therefore unlikely that image deterioration is perceived by users.

Though FIGS. 13A to 15 show an example where the adjustment amount for adjusting an electric current supplied to the light-emitting elements 602 is determined for each section corresponding to a light-emitting chip 400, the technology according to the present disclosure is not limited to this example. In some example embodiments, the entire light-emitting element array may be segmented into a plurality of sections, and the data generation unit 813 may determine, for each of the plurality of sections, an adjustment amount of an electric current supplied to the light-emitting elements 602 belonging to the section such that the unevenness in light amount among the sections is suppressed. Herein, the plurality of current sources 902 as described with reference to FIG. 9 may correspond to respective ones of such sections. Also in these example embodiments, the data generation unit 813 may determine, for each pixel position, the correction amount such that a residual component of the unevenness in light amount remaining after adjustment of the electric current is suppressed.

5. PROCESSING FLOW

Next, examples of several processing flows that may be executed by the image-forming apparatus 1 will be described with reference to FIGS. 16 and 17. In the following descriptions, a processing step is abbreviated as 'S'.

<5-1. Correction Amount Determination Processing>

Figure 16:
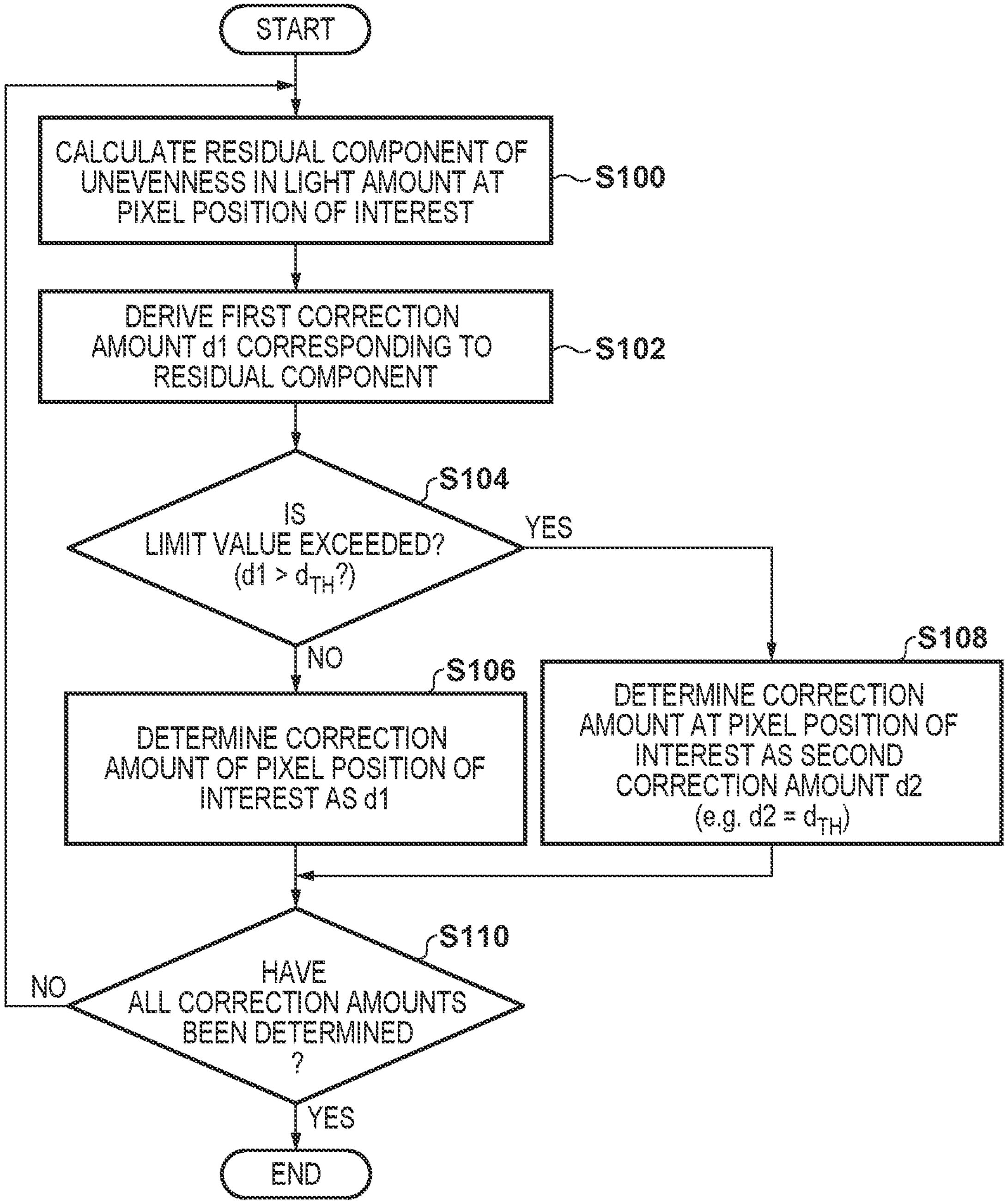
FIG. 16 is a flowchart showing an example of the flow of correction amount determination processing according to an embodiment.

FIG. 16 is a flowchart showing an example of the flow of correction amount determination processing according to an embodiment. The correction amount determination processing in FIG. 16 is executed when the data generation unit 813 generates correction data for light amount correction after determining the current adjustment amount for each light-emitting chip 400.

First, in S100, the data generation unit 813 focuses on one pixel position (pixel position of interest), and calculates a residual component of an unevenness in light amount at the pixel position of interest by subtracting an offset based on the current adjustment from the light amount indicated by the results of measurement of the unevenness in light amount. Next, in S102, the data generation unit 813 calculates a first correction amount d1 (e.g., a rate of change in the areal gradation for canceling out the residual component) corresponding to the calculated residual component.

Next, in S104, the data generation unit 813 determines whether or not the first correction amount d1 exceeds the preset limit value $d_{TH}$. If the first correction amount d1 does not exceed the limit value $d_{TH}$ ($d1 \leq d_{TH}$), in S106, the data generation unit 813 determines the correction amount at the pixel position of interest to be the first correction amount d1. On the other hand, if the first correction amount d1 exceeds the limit value $d_{TH}$ ($d1 > d_{TH}$), in S108, the data generation unit 813 determines the correction amount at the pixel position of interest to be the second correction amount d2 (e.g., $d2 = d_{TH}$).

Next, in S110, the data generation unit 813 determines whether or not correction amounts have been determined for all of the pixel positions. If there remains a pixel position for which the correction amount has not been determined, the above steps S100 to S108 are repeated for a new pixel position of interest. After the correction amounts have been determined for all of the pixel positions, the correction amount determination processing in FIG. 16 ends.

<5-2. Calibration Processing>

Figure 17:
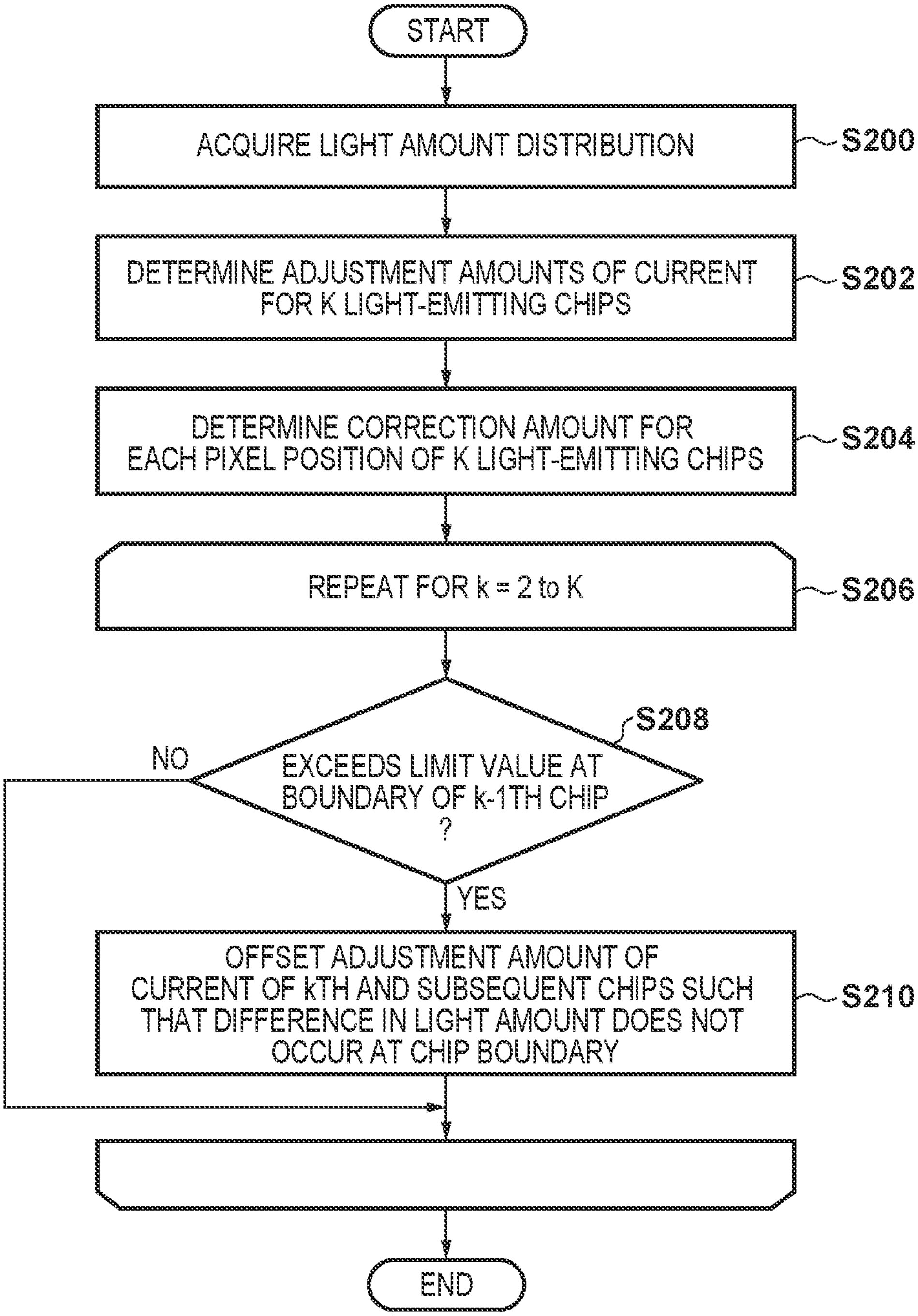
FIG. 17 is a flowchart showing an example of the flow of calibration processing according to an embodiment.

FIG. 17 is a flowchart showing an example of the flow of calibration processing according to an embodiment. The calibration processing in FIG. 17 may be executed, for example, in response to a user or an engineer setting, in the reading unit 100, a sheet with an image of a correction chart for calibration formed thereon.

First, in S200, the measurement unit 812 acquires a light amount distribution in the exposure head 106. For example, the measurement unit 812 obtains a read image of the correction chart 1000 based on reading of the sheet by the reading unit 100, detects the band-shaped regions 1001 to 1006 in the read image, and measures the light amount distribution. The measurement unit 812 outputs the obtained light amount distribution to the data generation unit 813.

Next, in S202, the data generation unit 813 determines adjustment amounts for currents to be supplied to K (e.g., K=20) light-emitting chips 400 so as to suppress an unevenness in light amount per light-emitting chip that appears in the light amount distribution obtained by the measurement unit 812. The data generation unit 813 generates control data indicating the adjustment amount (or the adjusted current amount) determined for each light-emitting chip 400, and stores the generated control data in storage unit 810.

Next, in S204, the data generation unit 813 determines the correction amount per pixel position in the K light-emitting chips 400 by executing the correction amount determination processing described with reference to FIG. 16. The data generation unit 813 generates correction data indicating the correction amount per pixel position, and stores the generated correction data in the storage unit 810.

Subsequent processing is repeated for each of the 2nd to Kth light-emitting chips 400-*k* (k=2, . . . , K) (S206). In S208, the data generation unit 813 determines whether or not the first correction amount d1 exceeds the limit value $d_{TH}$ at the pixel position corresponding to the rightmost light-emitting element of the k−1th light-emitting chip 400-(*k*−1). If the first correction amount d1 exceeds the limit value $d_{TH}$, in S210, the data generation unit 813 offsets the current adjustment amount for the kth and subsequent light-emitting chips such that a significant difference in light amount does not occur at a chip boundary adjacent to the pixel position, and updates the control data stored in the storage unit 810 in S202. When the repetition for the K-th light-emitting chip 400-K is completed, the calibration processing in FIG. 17 ends.

6. SUMMARY

So far, various embodiments, practical examples, and additional examples of the technology according to the present disclosure have been described in detail with reference to FIGS. 1 to 17. According to the above embodiments, when the image data for controlling light emission of the light-emitting elements in the light-emitting element array is corrected so as to suppress unevenness in light amount in the exposure apparatus that exposes the photosensitive member, the correction amount per pixel position is determined so as not to exceed the limit value. This configuration makes it possible to mitigate local unevenness in light amount while avoiding image deterioration caused by significant deformation of dot shapes formed as a result of exposure.

Furthermore, in the above embodiments, the adjustment amount for the current to be supplied from the current source provided in each light-emitting chip to the light-emitting elements is determined so as to suppress unevenness in light amount per light-emitting chip, and the correction amount per pixel position is determined so as to suppress a residual component of the unevenness in light amount that remains after the adjustment. According to this configuration, the proportion of the pixel positions that require a correction amount that exceeds the limit value in order to cancel out the unevenness in light amount is reduced. Therefore, a sufficiently favorable light amount distribution can be achieved even if the unevenness in light amount cannot be completely canceled out at those pixel positions.

In the above embodiments, the aforementioned adjustment amount for the current to be supplied by each current source is determined based on a difference between a target light amount and a light amount measured in advance for a specific light-emitting element selected from light-emitting elements connected to the current source (e.g., so as to compensate for the difference). In general, variation in the light amount among light-emitting elements supplied with a current from the same current source is small. Therefore, by using a method of making the light amount of a specific light-emitting element equal to the target light amount as well as correcting image data for pixel positions corresponding to the other light-emitting elements supplied with a current from the same current source, the individual correction amounts can be kept to relatively small values.

In the above embodiments, the current adjustment amount for a second light-emitting chip adjacent to a first light-emitting chip is determined based on not only the difference between the target light amount and the light amount of the specific light-emitting element, but also the correction amount determined for a pixel position located at a boundary of the first light-emitting chip. It is therefore possible to prevent a light amount difference that causes a noticeable density change in a printed image at the boundary between the first light-emitting chip and the second light-emitting chip. Further, if the light-emitting element array includes three or more light-emitting chips, the current adjustment amount and the correction amount per pixel position are determined in order from the first light-emitting chip at one end, thereby realizing an appropriately calibrated light amount distribution of the exposure apparatus.

In the above embodiments, the image data correction includes, for each pixel of interest, changing the areal light amount in an image region including the pixel of interest and neighboring pixels in accordance with the correction amount determined for the pixel of interest. The rate of change in such an areal light amount may be dealt with as a quantitative index that correlates with the degree of deformation of the dot shape. Thus, by setting the aforementioned limit value from the viewpoint of the rate of change in the areal light amount, it is possible to effectively restrict the correction amount to be determined for each pixel position such that the dot shape is not deformed excessively.

In the above embodiments, examples have mainly been described in which the correction amount per pixel position in image data is determined so as to suppress a residual component of an unevenness in light amount that remains after adjusting the current supplied from a reference current source. However, the technology according to the present disclosure is not limited to this example. For example, the data generation unit 813 may also determine the correction amount per pixel position (within a range that does not exceed the limit value) so as to suppress not the residual component of the unevenness in light amount but the unevenness in light amount itself that appears in a measured light amount distribution.

7. OTHER EMBODIMENTS

Embodiment(s) of the present disclosure can also be realized by a computer of a system or apparatus that reads out and executes computer-executable instructions (e.g. one or more programs) recorded on a storage medium (which may also be referred to more fully as a 'non-transitory computer-readable storage medium') to perform the functions of one or more of the above-described embodiment(s) and/or that includes one or more circuits (e.g. application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g. central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-060834, which was filed on Apr. 4, 2023 and which is hereby incorporated by reference herein in its entirety.

What is claimed is:

1. An exposure apparatus that exposes a photosensitive member with light in accordance with image data, the exposure apparatus comprising:

a plurality of light-emitting elements that are arranged along a direction of a rotation axis of the photosensitive member and configured to emit light for exposing the photosensitive member; and at least one processor configured to:

control turning on and off of the plurality of light-emitting elements in accordance with the image data;

generate correction data for use in increasing or decreasing the number of the light-emitting elements to be turned on based on a correction amount for correcting unevenness in light amount; and correct the image data in accordance with a value indicated by the correction data, wherein the correction data is generated such that the correction data indicates a first value for a pixel for which the correction amount indicates the first value does not exceed a predetermined limit value, and the correction data indicates a second value for a pixel for which the correction amount indicates a value that exceeds the predetermined limit value, the second value being equal to or smaller than the predetermined limit value, wherein the exposure apparatus comprises a plurality of light-emitting chips that include respective subsets of the plurality of light-emitting elements, wherein each of the plurality of light-emitting chips includes a current source that supplies light-emitting elements with an electric current, wherein the at least one processor is further configured to determine an adjustment amount of the electric current such that the unevenness in light amount among the plurality of light-emitting chips is suppressed, and wherein the electric current supplied from each current source is adjusted based on the adjustment amount.

2. The exposure apparatus according to claim 1, wherein the at least one processor is further configured to determine the correction amount such that a residual component of the unevenness in light amount remaining after adjustment of the electric current is suppressed.

3. The exposure apparatus according to claim 1, wherein each of the plurality of light-emitting chips includes a plurality of current sources.

4. The exposure apparatus according to claim 1, wherein the at least one processor is further configured to determine the adjustment amount of the electric current supplied from each current source based on a difference between a target light amount and a light amount measured in advance for a specific light-emitting element selected from among light-emitting elements connected to the current source.

5. The exposure apparatus according to claim 4, wherein the specific light-emitting element is a light-emitting element of which output light amount is the lowest among the light-emitting elements connected to the current source.

6. An exposure apparatus that exposes a photosensitive member with light in accordance with image data, the exposure apparatus comprising:

a plurality of light-emitting elements that are arranged along a direction of a rotation axis of the photosensitive member and configured to emit light for exposing the photosensitive member; and at least one processor configured to:

control turning on and off of the plurality of light-emitting elements in accordance with the image data;

generate correction data for use in increasing or decreasing the number of the light-emitting elements to be turned on based on a correction amount for correcting unevenness in light amount; and correct the image data in accordance with a value indicated by the correction data, wherein the correction data is generated such that the correction data indicates a first value for a pixel for which the correction amount indicates the first value does not exceed a predetermined limit value, and the correction data indicates a second value for a pixel for which the correction amount indicates a value that exceeds the predetermined limit value, the second value being equal to or smaller than the predetermined limit value, wherein the plurality of light-emitting elements form a light-emitting element array including a plurality of sections, wherein the at least one processor is further configured to determine, for each of the plurality of sections, an adjustment amount of an electric current supplied to the light-emitting elements that belong to the section such that the unevenness in light amount among the plurality of sections is suppressed, and wherein the electric current supplied to the light-emitting elements is adjusted based on the adjustment amount.

7. The exposure apparatus according to claim 6, wherein the exposure apparatus comprises a plurality of light-emitting chips that include respective subsets of the plurality of light-emitting elements, wherein each of the plurality of light-emitting chips includes a plurality of current sources that supply the light-emitting elements with respective electric currents, and wherein each of the plurality of current sources corresponds to one of the plurality of sections.

8. An image-forming apparatus comprising:

a photosensitive member; and an exposure apparatus, wherein the exposure apparatus includes:

a plurality of light-emitting elements that are arranged along a direction of a rotation axis of the photosensitive member and configured to emit light for exposing the photosensitive member; and at least one processor configured to:

control turning on and off of the plurality of light-emitting elements in accordance with image data;

generate correction data for use in increasing or decreasing the number of the light-emitting elements to be turned on based on a correction amount for correcting unevenness in light amount; and correct the image data in accordance with a value indicated by the correction data, wherein the correction data is generated such that the correction data indicates a first value for a pixel for which the correction amount indicates the first value does not exceed a predetermined limit value, and the correction data indicates a second value for a pixel for which the correction amount indicates a value that exceeds the predetermined limit value, the second value being equal to or smaller than the predetermined limit value, wherein the plurality of light-emitting elements form a light-emitting element array including a plurality of sections, wherein the at least one processor is further configured to determine, for each of the plurality of sections, an adjustment amount of an electric current supplied to the light-emitting elements that belong to the section such that the unevenness in light amount among the plurality of sections is suppressed, and wherein the electric current supplied to the light-emitting elements is adjusted based on the adjustment amount.

* * * * *